(12) United States Patent
Cha et al.

(10) Patent No.: US 11,321,581 B2
(45) Date of Patent: May 3, 2022

(54) DETECTING AND MITIGATING ANOMALIES AND DEGRADATION ASSOCIATED WITH DEVICES AND THEIR OPERATIONS

(71) Applicant: SAS Institute Inc., Cary, NC (US)

(72) Inventors: Kyungduck Cha, Cary, NC (US); Carol Wagih Sadek, Durham, NC (US); Zohreh Asgharzadeh Talebi, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 306 days.

(21) Appl. No.: 16/866,836

(22) Filed: May 5, 2020

(65) Prior Publication Data

US 2020/0387747 A1     Dec. 10, 2020

Related U.S. Application Data

(60) Provisional application No. 62/900,214, filed on Sep. 13, 2019, provisional application No. 62/858,498, filed on Jun. 7, 2019.

(51) Int. Cl.
| | | |
|---|---|---|
| *G06K 9/62* | | (2022.01) |
| *G06K 9/00* | | (2022.01) |
| *G06N 3/08* | | (2006.01) |

(52) U.S. Cl.
CPC ....... *G06K 9/6232* (2013.01); *G06K 9/00536* (2013.01); *G06K 9/6218* (2013.01); *G06K 9/6256* (2013.01); *G06N 3/08* (2013.01)

(58) Field of Classification Search
CPC ............. G09K 9/6232; G09K 9/00536; G09K 9/6218; G09K 9/6256; G06N 3/08
See application file for complete search history.

(56) References Cited

U.S. PATENT DOCUMENTS 7,437,397 B1 * 10/2008 Koudas .............. G06K 9/00536
                                                              708/422
10,637,544 B1 * 4/2020 Shattil ................. H04W 72/046
(Continued)

FOREIGN PATENT DOCUMENTS

| AU | 2010230857 | 5/2015 |
|---|---|---|
| CN | 106055885 | 12/2018 |

OTHER PUBLICATIONS

Aggarwal, "Chapter 1: High-Dimensional Outlier Detection: The Subspace Method", Outlier Analysis, Chapter 5, 2013, 76 pages.
(Continued)

*Primary Examiner* — Raymond L Nimox
(74) *Attorney, Agent, or Firm* — Kilpatrick Townsend & Stockton LLP

(57) ABSTRACT

Physical-device anomalies and degradation can be mitigated by implementing some aspects described herein. For example, a system can determine a first data window and a second data window by applying a window function to streaming data. The system can determine a first principal eigenvector of the first data window and a first principal eigenvector of the second data window. The system can determine an angle change between the first principal eigenvectors of the two data windows. The system can then detect an anomaly based on determining that the angle change exceeds a predefined angle-change threshold. Additionally or alternatively, the system may compare the first principal eigenvector for the second data window to a baseline value to determine an absolute angle associated with the second data window. The system can then detect a degradation based on determining that the absolute angle exceeds a predefined absolute-angle threshold.

27 Claims, 25 Drawing Sheets

(56) References Cited

U.S. PATENT DOCUMENTS

| | | | | |
|---|---|---|---|---|
| 2005/0177317 | A1* | 8/2005 | Hsiung | G06K 9/6253 702/22 |
| 2014/0122039 | A1* | 5/2014 | Xu | G06K 9/6232 703/2 |
| 2015/0332408 | A1* | 11/2015 | Menon | G07C 5/008 705/4 |
| 2016/0050343 | A1* | 2/2016 | Kutz | H04N 5/144 348/239 |

OTHER PUBLICATIONS

Akoglu et al., "Graph based Anomaly Detection and Description: A Survey", Data Mining and Knowledge Discovery, May 2015, pp. 1-68.

Dos Santos Teixeira et al., "Data Stream Anomaly Detection through Principal Subspace Tracking", SAC '10: Proceedings of the 2010 ACM Symposium on Applied Computing, Mar. 2010, pp. 1609-1616.

Heinemann et al., "Anomaly Detection in Networks by their Laplacians' Divergence Measures", School of Computer Science and Engineering, The Hebrew University of Jerusalem, Jan. 30, 2010, pp. 1-63.

Huang, "In-Network PCA and Anomaly Detection", Advances in Neural Information Processing Systems 19, 2006, 8 pages.

Kriegel et al., "Outlier Detection Techniques", The 2010 SIAM International Conference on Data Mining, 2010, 73 pages.

Kurt et al., "Real-Time Nonparametric Anomaly Detection in High-Dimensional Settings", arXiv: Learning, Sep. 14, 2018, pp. 1-29.

Lee et al., "Anomaly Detection via Online Over-Sampling Principal Component Analysis", IEEE Transactions on Knowledge and Data Engineering, vol. 25, No. 7, Jul. 2013, pp. 1460-1470.

O'Reilly, "Anomaly Detection in Non-Stationary and Distributed Environments", Submitted for the Degree of Doctor of Philosophy from the University of Surrey, Nov. 2014, 173 pages.

Wang et al., "High dimensional change point estimation via sparse projection", Journal of the Royal Statistical Methodology Series B, vol. 80, issue 1, Jan. 2018, pp. 57-83.

Zhang et al., "An angle-based subspace anomaly detection approach to high-dimensional data: With an application to industrial fault detection", Reliability Engineering and System Safety 142, 2015, pp. 482-497.

* cited by examiner

DETECTING AND MITIGATING ANOMALIES AND DEGRADATION ASSOCIATED WITH DEVICES AND THEIR OPERATIONS

REFERENCE TO RELATED APPLICATION

This claims the benefit of priority under 35 U.S.C. § 119(e) to U.S. Provisional Patent Application No. 62/858,498, filed Jun. 7, 2019, and to U.S. Provisional Patent Application No. 62/900,214, filed Sep. 13, 2019, the entirety of each of which is hereby incorporated by reference herein.

TECHNICAL FIELD

The present disclosure relates generally to diagnostic analysis of a physical device. More specifically, but not by way of limitation, this disclosure relates to detecting and mitigating anomalies and degradation associated with devices and their operations.

BACKGROUND

Consumers and businesses rely on physical devices to perform a variety of tasks. Physical devices can include one or more electronic devices, one or more mechanical devices, or both. Examples of physical devices include sensors; light sources, such as light bulbs and light emitting diodes; vehicles, such as cars, trains, busses, and airplanes; wind turbines; solar panels; heaters or furnaces; pumps; valves; and computers, such as laptop computers, desktop computers, mobile phones, and servers. These physical devices are sometimes monitored to detect failures and other problems therewith.

SUMMARY

One example of the present disclosure includes a system having a processor and a memory device comprising instructions that are executable by the processor for causing the processor to perform operations. The operations can include receiving streaming data from a plurality of sensors, the streaming data being multidimensional data that includes a plurality of data points spanning a period of time. The operations can include determining a first data window by applying a window function to the streaming data, the first data window spanning a first timespan and having a predefined number of consecutive data points from the streaming data. The operations can include determining a first principal eigenvector of the first data window. The operations can include determining a second data window by applying the window function to the streaming data, the second data window spanning a second timespan that is subsequent to the first timespan and having the predefined number of consecutive data points from the streaming data, wherein the second data window includes at least one data point that is different from the first data window. The operations can include determining a first principal eigenvector of the second data window. The operations can include determining an angle change between first principal eigenvector of the first data window and the first principal eigenvector of the second data window. The operations can include determining that the angle change exceeds a predefined angle-change threshold. The operations can include detecting an anomaly associated with a physical device based on determining that the angle change exceeds the predefined angle-change threshold, the physical device being associated with the plurality of sensors. The operations can include comparing the first principal eigenvector for the second data window to a baseline unit vector to determine an absolute angle associated with the second data window. The operations can include determining that the absolute angle exceeds a predefined absolute-angle threshold. The operations can include detecting a degradation associated with the physical device based on determining that the absolute angle exceeds the predefined absolute-angle threshold. The operations can include generating one or more electronic signals indicating at least one of the anomaly or the degradation associated with the physical device.

Another example of the present disclosure can include a method. The method can include receiving streaming data from a plurality of sensors, the streaming data being multidimensional data that includes a plurality of data points spanning a period of time. The method can included determining a first data window by applying a window function to the streaming data, the first data window spanning a first timespan and having a predefined number of consecutive data points from the streaming data. The method can include determining a first principal eigenvector of the first data window. The method can include determining a second data window by applying the window function to the streaming data, the second data window spanning a second timespan that is subsequent to the first timespan and having the predefined number of consecutive data points from the streaming data, wherein the second data window includes at least one data point that is different from the first data window. The method can include determining a first principal eigenvector of the second data window. The method can include determining an angle change between first principal eigenvector of the first data window and the first principal eigenvector of the second data window. The method can include determining that the angle change exceeds a predefined angle-change threshold. The method can include detecting an anomaly associated with a physical device based on determining that the angle change exceeds the predefined angle-change threshold, the physical device being associated with the plurality of sensors. The method can include comparing the first principal eigenvector for the second data window to a baseline unit vector to determine an absolute angle associated with the second data window. The method can include determining that the absolute angle exceeds a predefined absolute-angle threshold. The method can include detecting a degradation associated with the physical device based on determining that the absolute angle exceeds the predefined absolute-angle threshold. The method can include generating one or more electronic signals indicating at least one of the anomaly or the degradation associated with the physical device. Some or all of the method steps may be implemented by a processor.

Yet another example of the present disclosure can include a non-transitory computer-readable medium comprising program code that is executable by a processor for causing the processor to perform operations. The operations can include receiving streaming data from a plurality of sensors, the streaming data being multidimensional data that includes a plurality of data points spanning a period of time. The operations can include determining a first data window by applying a window function to the streaming data, the first data window spanning a first timespan and having a predefined number of consecutive data points from the streaming data. The operations can include determining a first principal eigenvector of the first data window. The operations can include determining a second data window by applying the window function to the streaming data, the second data window spanning a second timespan that is subsequent to the first timespan and having the predefined number of consecutive data points from the streaming data, wherein the second data window includes at least one data point that is different from the first data window. The operations can include determining a first principal eigenvector of the second data window. The operations can include determining an angle change between first principal eigenvector of the first data window and the first principal eigenvector of the second data window. The operations can include determining that the angle change exceeds a predefined angle-change threshold. The operations can include detecting an anomaly associated with a physical device based on determining that the angle change exceeds the predefined angle-change threshold, the physical device being associated with the plurality of sensors. The operations can include comparing the first principal eigenvector for the second data window to a baseline unit vector to determine an absolute angle associated with the second data window. The operations can include determining that the absolute angle exceeds a predefined absolute-angle threshold. The operations can include detecting a degradation associated with the physical device based on determining that the absolute angle exceeds the predefined absolute-angle threshold. The operations can include generating one or more electronic signals indicating at least one of the anomaly or the degradation associated with the physical device.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
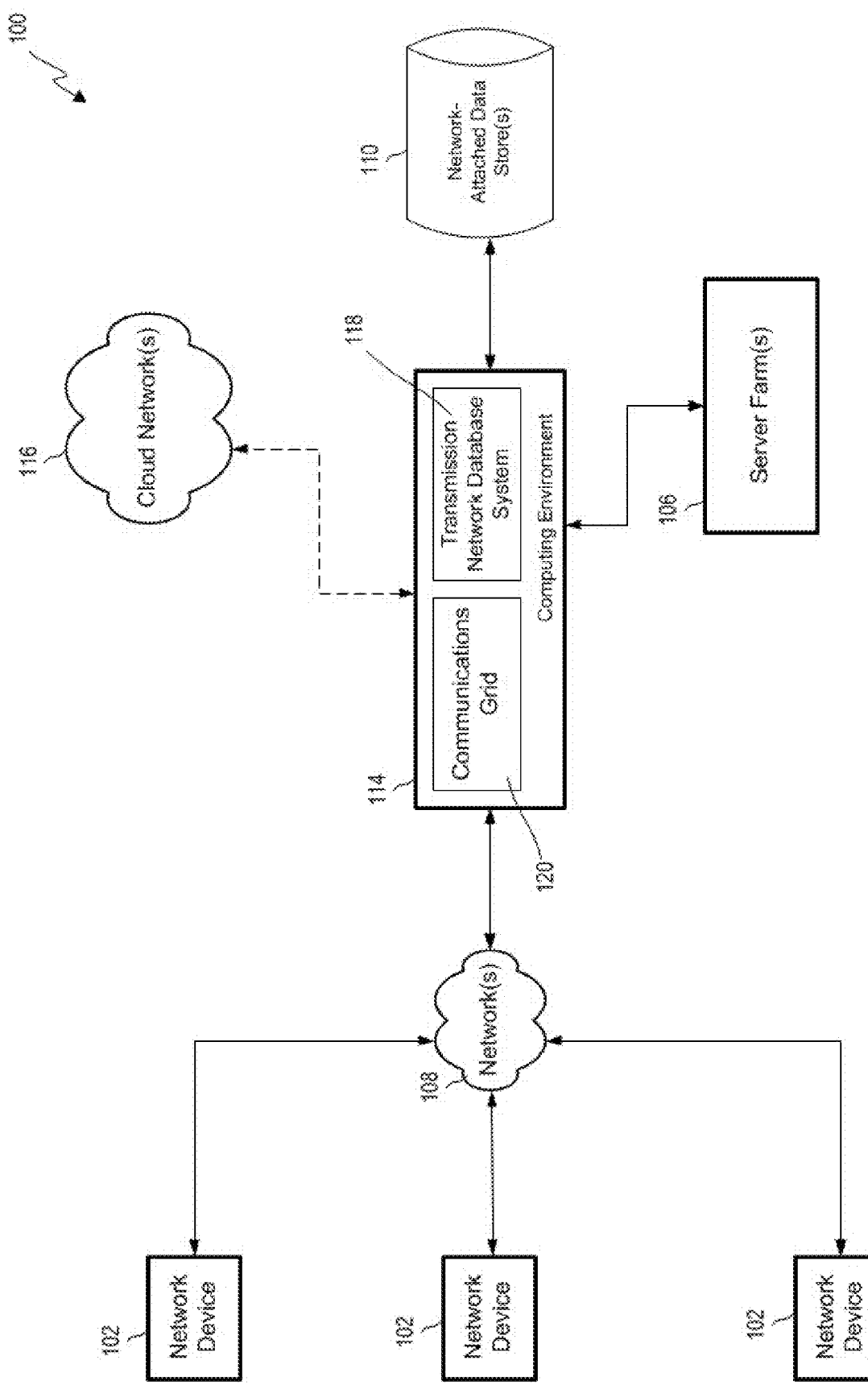
FIG. 1 depicts a block diagram of an example of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Anomalies and degradations associated with devices and their operations can negatively impact the performance of those devices. An anomaly is a deviation from what is standard, normal, or expected. Degradation is different from an anomaly, in that degradation is an expected decline in the physical device's performance over a period of time. In many cases, anomalies and degradations can lead to breakdowns, failures, or otherwise suboptimal performance of the physical devices. Failure to timely detect anomalies and degradations can exacerbate such problems and can make it more difficult, time consuming, and expensive to remedy them. In some situations, failure to timely detect anomalies and degradations can also result in hazardous conditions for operators of the physical devices and surrounding workers, for example if the physical device becomes volatile, unstable, or overheats.

Certain aspects and features of the present disclosure can overcome one or more of the abovementioned problems by detecting and mitigating anomalies and degradations associated with devices and their operations. For example, a detection system of the present disclosure can receive streaming data from one or more sensors associated with a physical device, such as an industrial furnace. The detection system can apply a sliding window to the streaming data to determine a first data window and a second data window, where the second data window is later than the first data window in time. The detection system can then determine a first principal eigenvector of the first data window and a first principal eigenvector of the second data window. Having determined the first principal eigenvectors of each of the data windows, the detection system can determine an angle change between the first principal eigenvectors of the two data windows. If the angle change exceeds a predefined angle-change threshold, the detection system can determine that an anomaly has occurred or is occurring with respect to the physical device. In this way, the detection system can automatically detect anomalies associated with the physical device.

Additionally or alternatively, the detection system can determine an absolute angle corresponding to the second data window. The detection system can then compare the absolute angle to a predefined absolute-angle threshold. If the absolute angle exceeds the predefined absolute-angle threshold, the detection system can determine that degradation has occurred or is occurring with respect to the physical device. In this way, the detection system can automatically detect degradations associated with the physical device.

In some examples, the detection system may not determine any other eigenvectors of a data window besides the first principal eigenvector. For example, the processor can determine the first principal eigenvector of the first data window without determining any other eigenvectors of the first data window. Likewise, the processor can determine the first principal eigenvector of the second data window without determining any other eigenvectors of the second data window. This can significantly reduce processing times and consumption of computing resources (e.g., processing power and memory), since the processor only determines the eigenvectors used to implement the rest of the process and avoids determining other eigenvectors that may be extraneous.

In some examples, the degradation system can automatically implement one or more countermeasures configured to mitigate a detected anomaly or degradation associated with the physical device. For example, the detection system can generate one or more electronic signals based on the detected anomaly or the degradation, where the electronic signals are configured to cause the anomaly or degradation to be mitigated. In one such example, the electronic signals can be control signals. The detection system can generate and transmit the control signals to the physical device for causing the physical device to change an operational setting thereof, in an effort to mitigate the anomaly or degradation.

In another example, the detection system can transmit the control signals to an electronic component associated with the physical device for causing the electronic component to adjust an operational setting of the physical device, in an effort to mitigate the anomaly or degradation. In still another example, the electronic signals may indicate a type and severity of the anomaly or the degradation. The detection system can transmit the electronic signal(s) to a remote computing device for causing the remote computing device to assist with mitigating the anomaly or degradation. For example, the remote computing device can determine a type and severity of an anomaly based on the electronic signals, determine a countermeasure based on the type and severity of the anomaly, and implement the countermeasure in an effort to mitigate the anomaly. In this way, the detection system can automatically take corrective action in response to detected anomalies and degradations in order to mitigate such problems.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable in connection with detecting and mitigating anomalies and degradation associated with physical devices according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data to a network-attached data store 110 for storage. The computing environment 114 may later retrieve the data from the network-attached data store 110 and use the data for detecting and mitigating anomalies.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for detecting and mitigating anomalies.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for detecting and mitigating anomalies. For example, the computing environment 114, a network device 102, or both can implement one or more versions of the processes discussed with respect to any of the figures.

Figure 2:
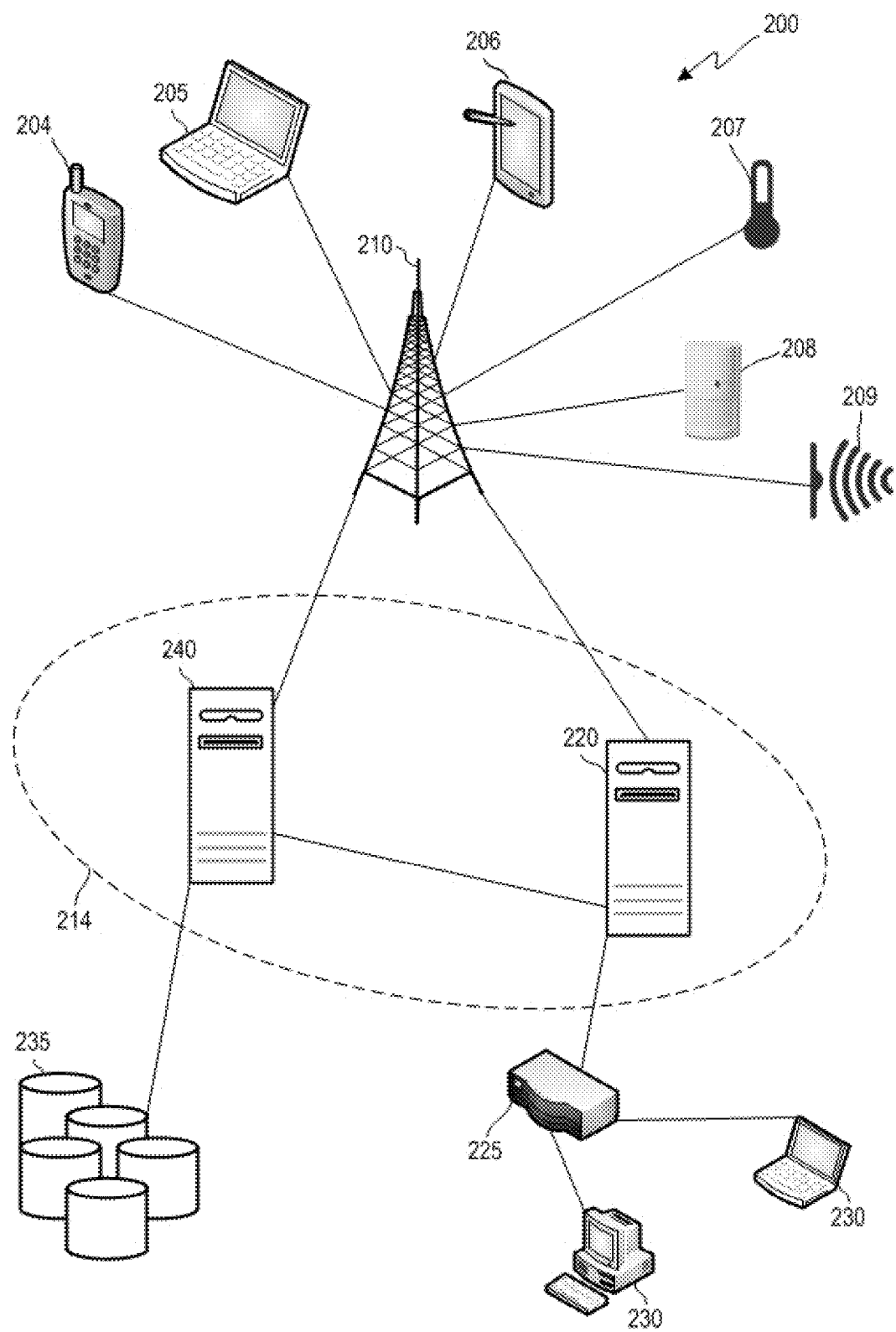
FIG. 2 depicts an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data for detecting and mitigating anomalies).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project involving detecting and mitigating anomalies from data, the computing environment 214 can perform a pre-analysis of the data. The pre-analysis can include determining whether the data is in a correct format for and, if not, reformatting the data into the correct format.

Figure 3:
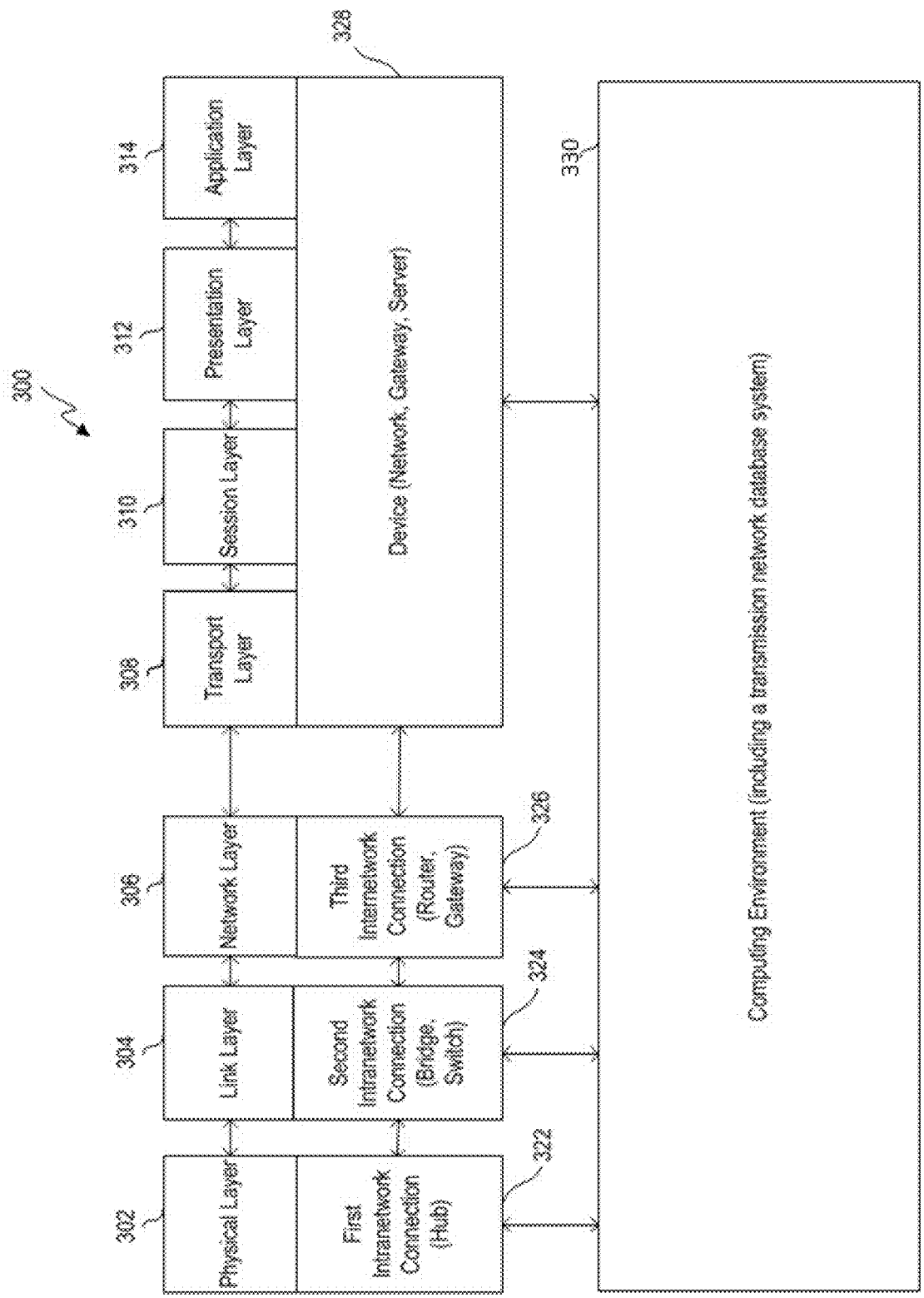
FIG. 3 depicts a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for detecting and mitigating anomalies, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for detecting and mitigating anomalies.

Figure 4:
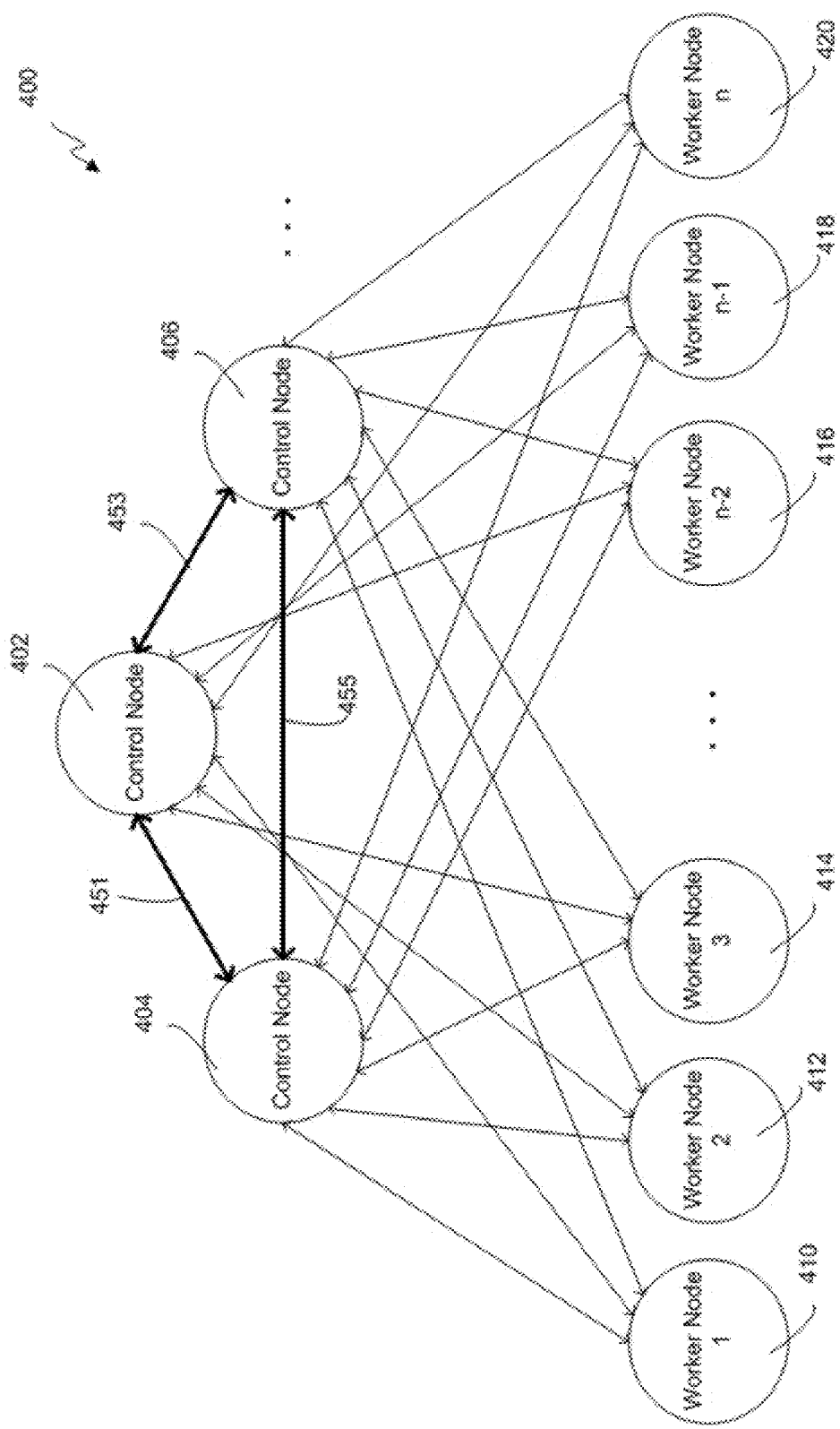
FIG. 4 depicts a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to detecting and mitigating anomalies. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for detecting and mitigating anomalies can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may perform its analysis using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to detect and mitigate anomalies associated with physical devices.

Figure 5:
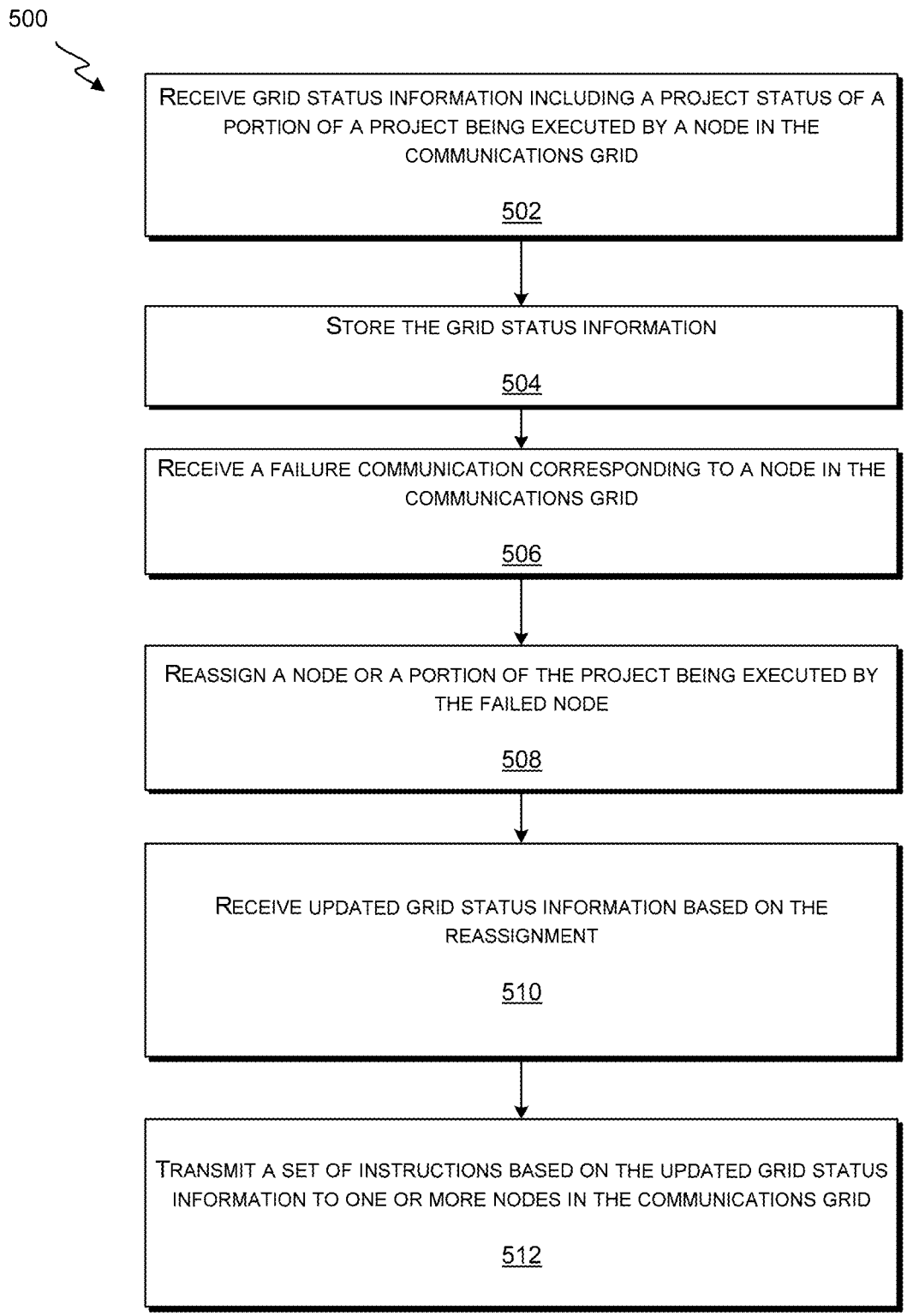
FIG. 5 depicts a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
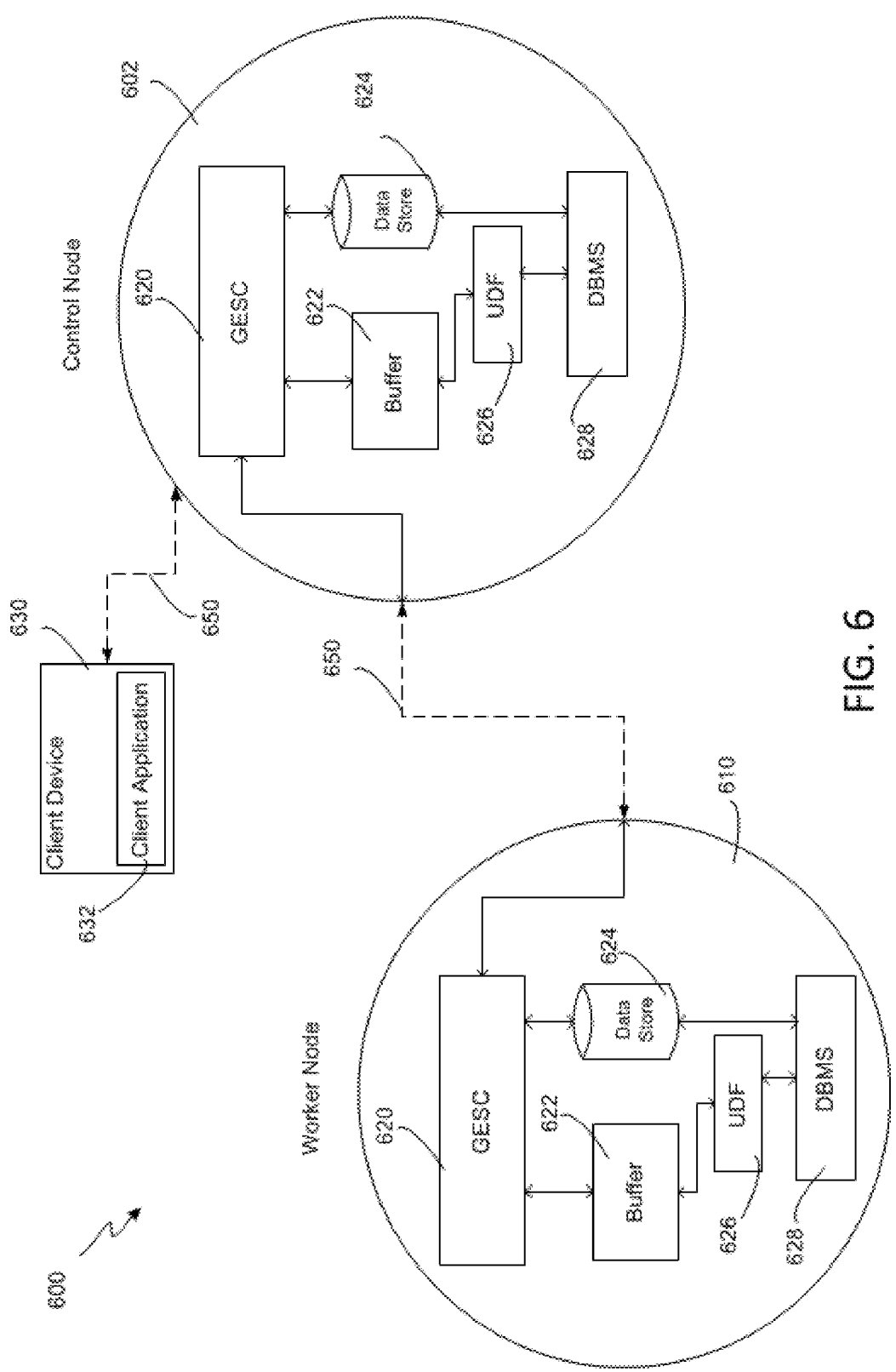
FIG. 6 depicts a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
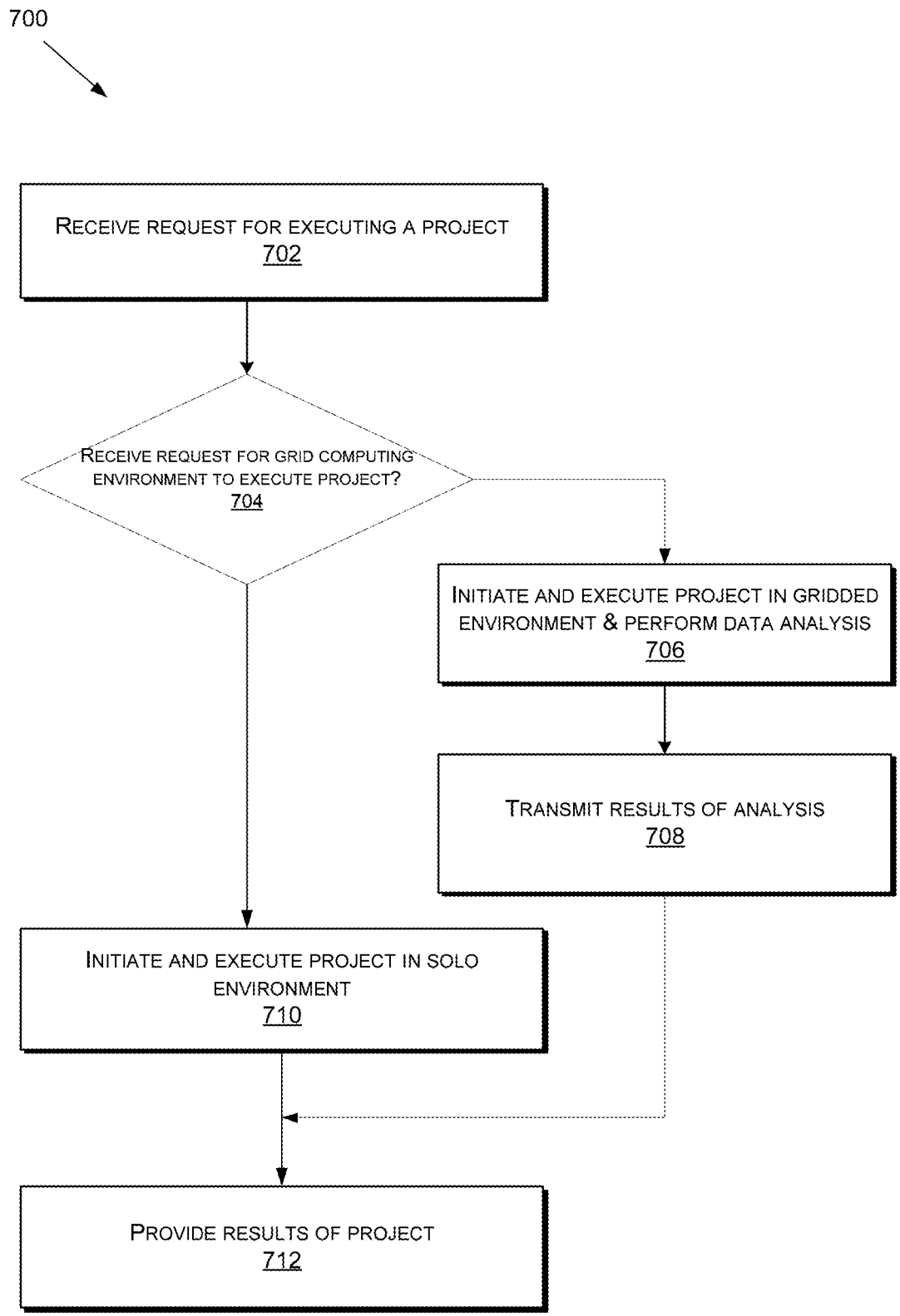
FIG. 7 depicts a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
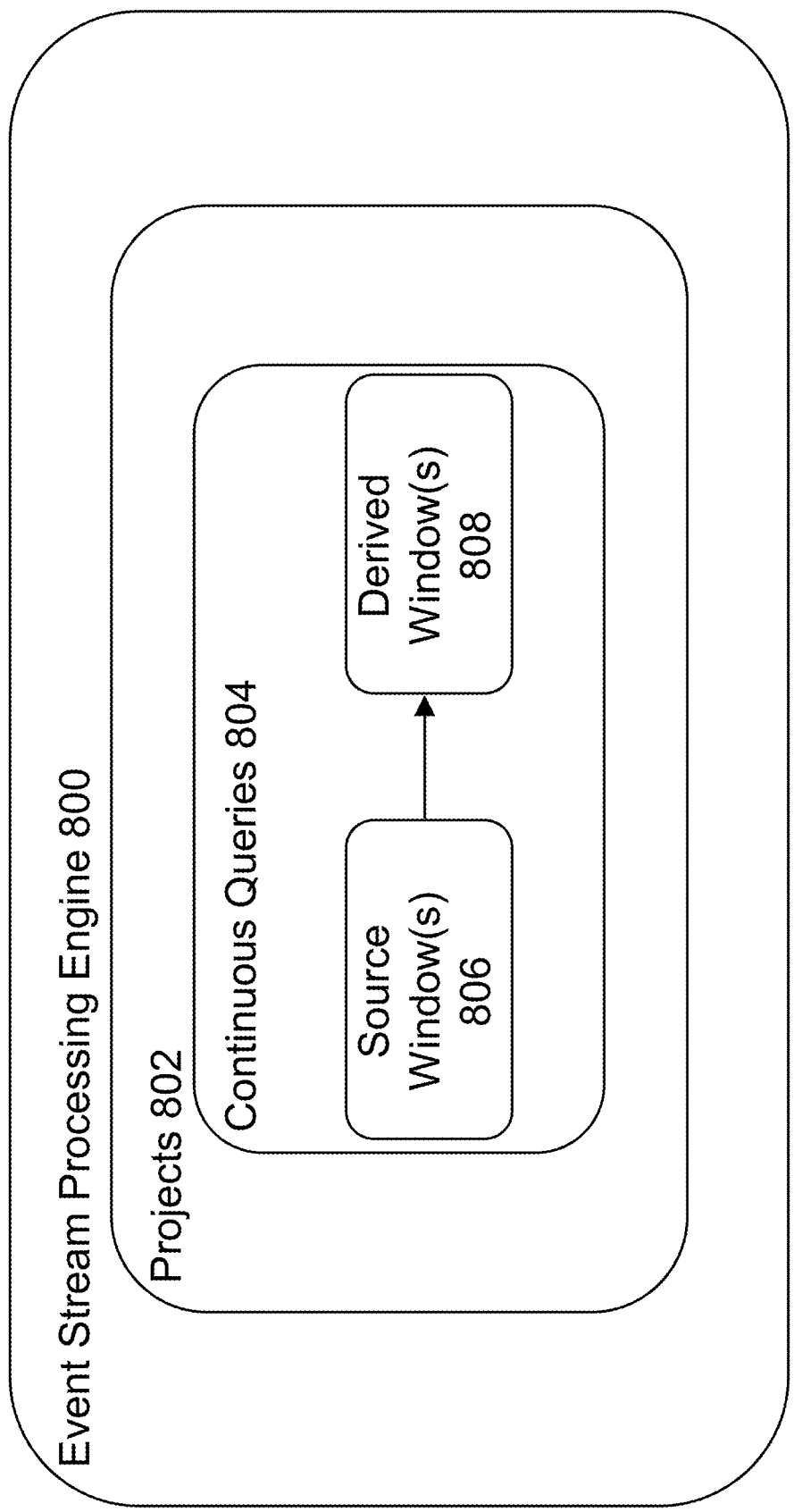
FIG. 8 depicts a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
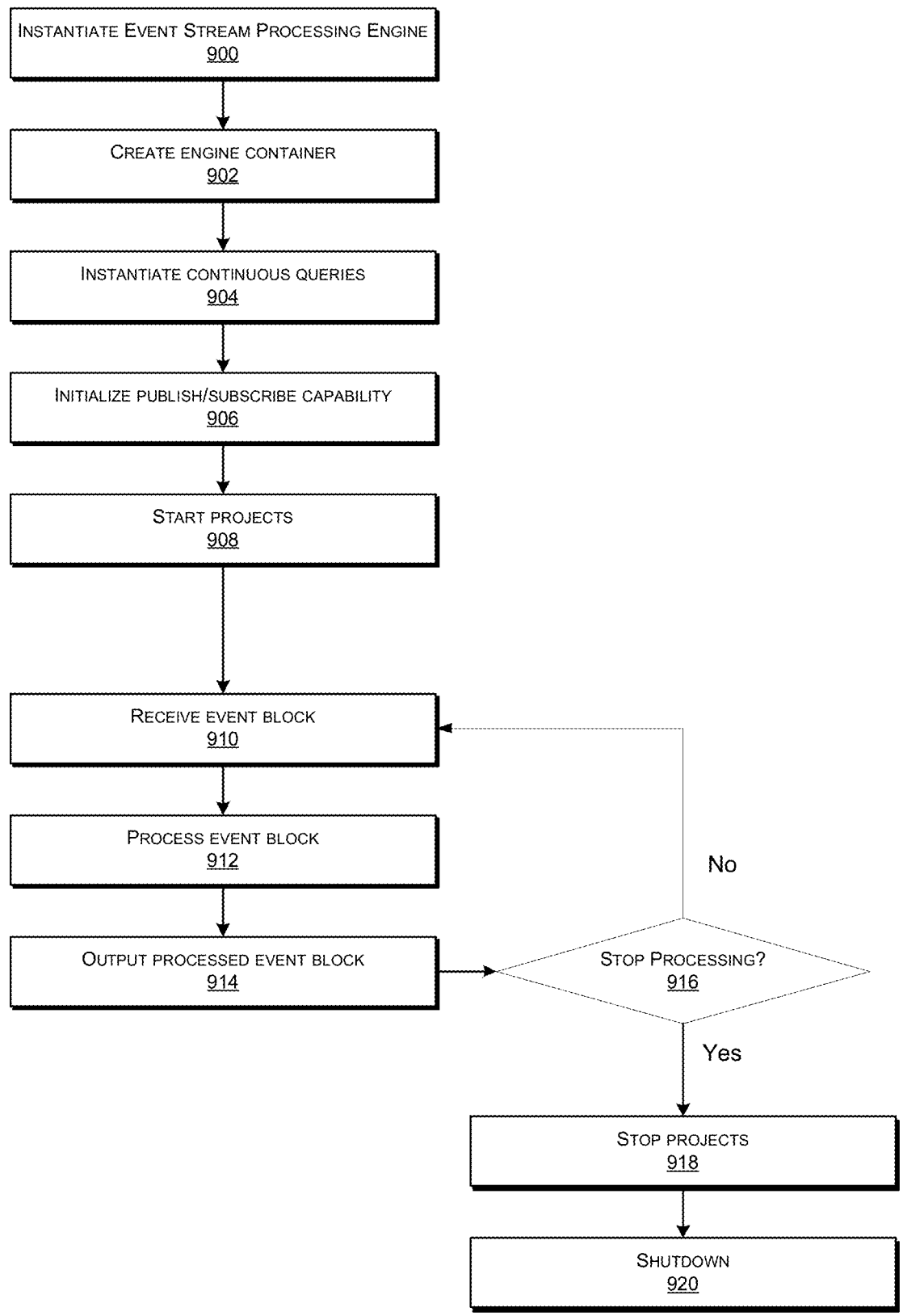
FIG. 9 depicts a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
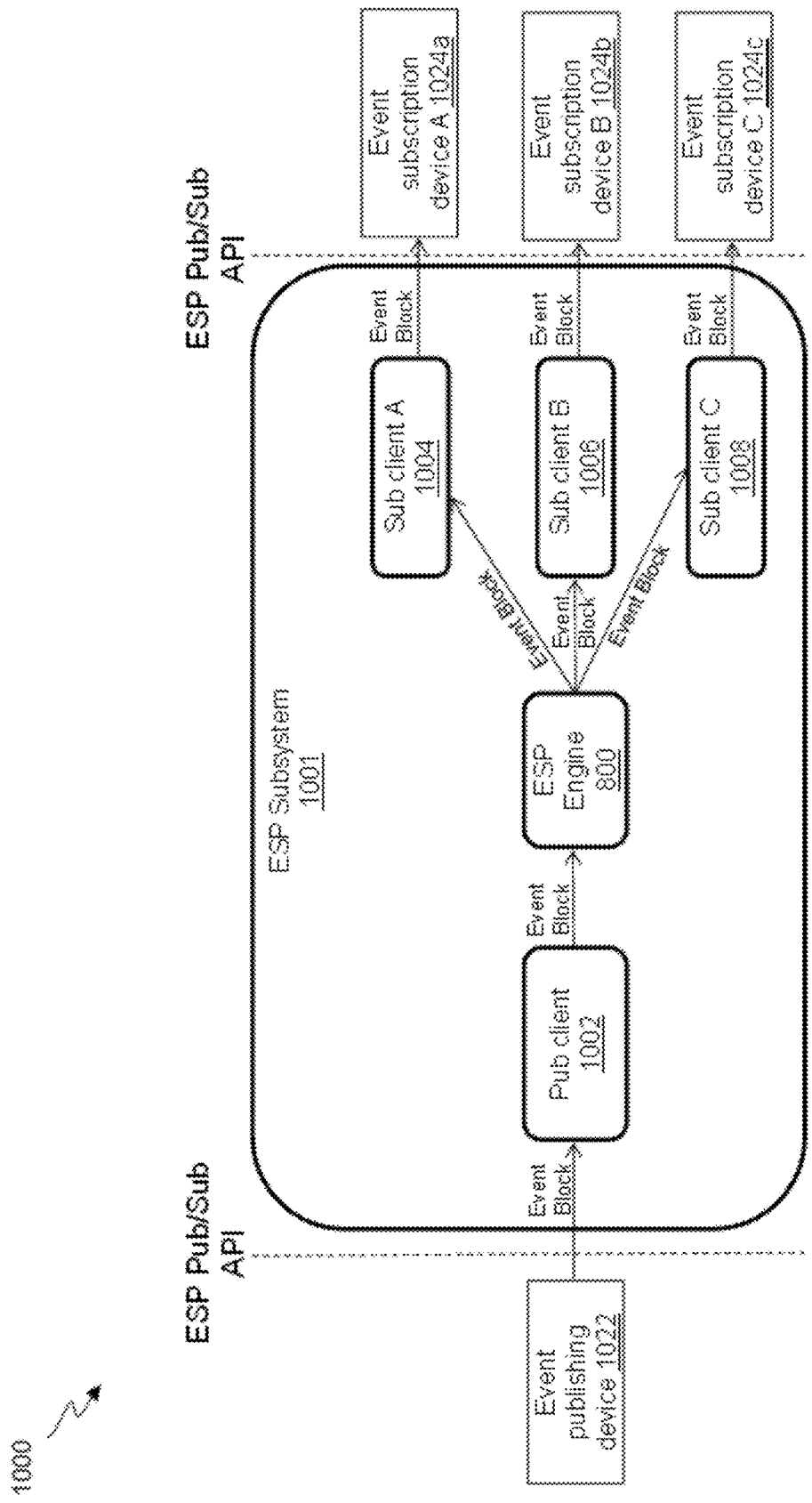
FIG. 10 depicts a block diagram of an ESP system interfacing between a publishing device and multiple event subscribing devices according to some aspects.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
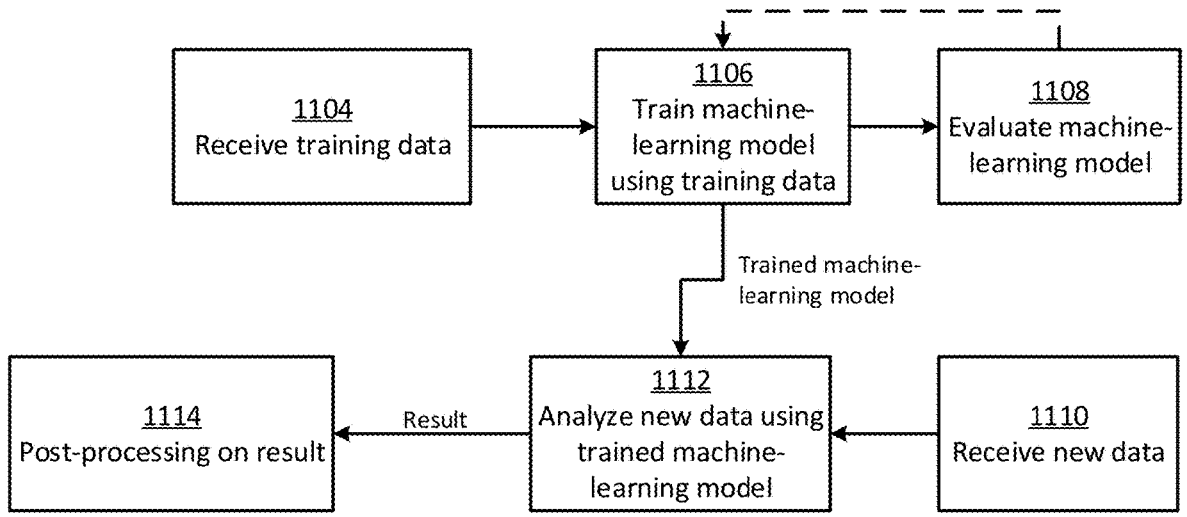
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
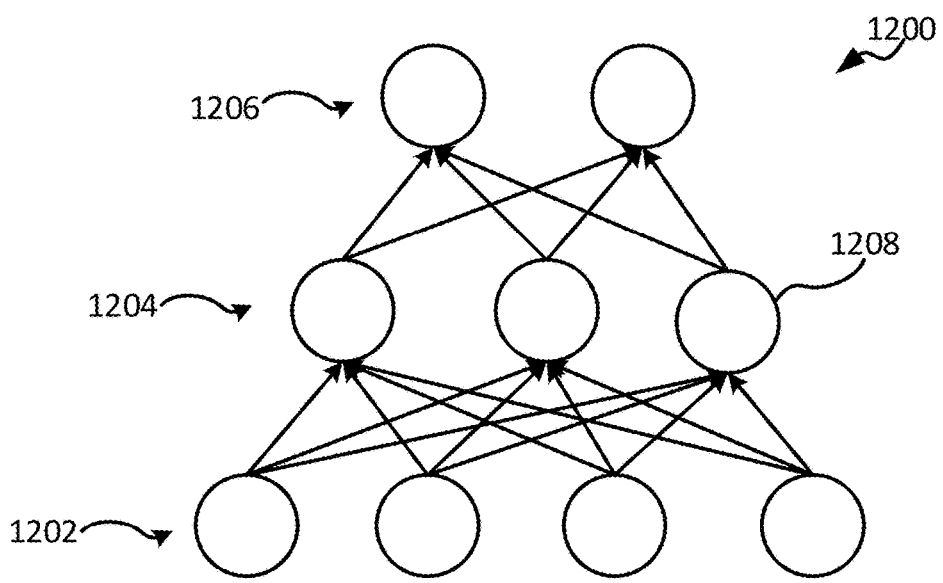
FIG. 12 is a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13:
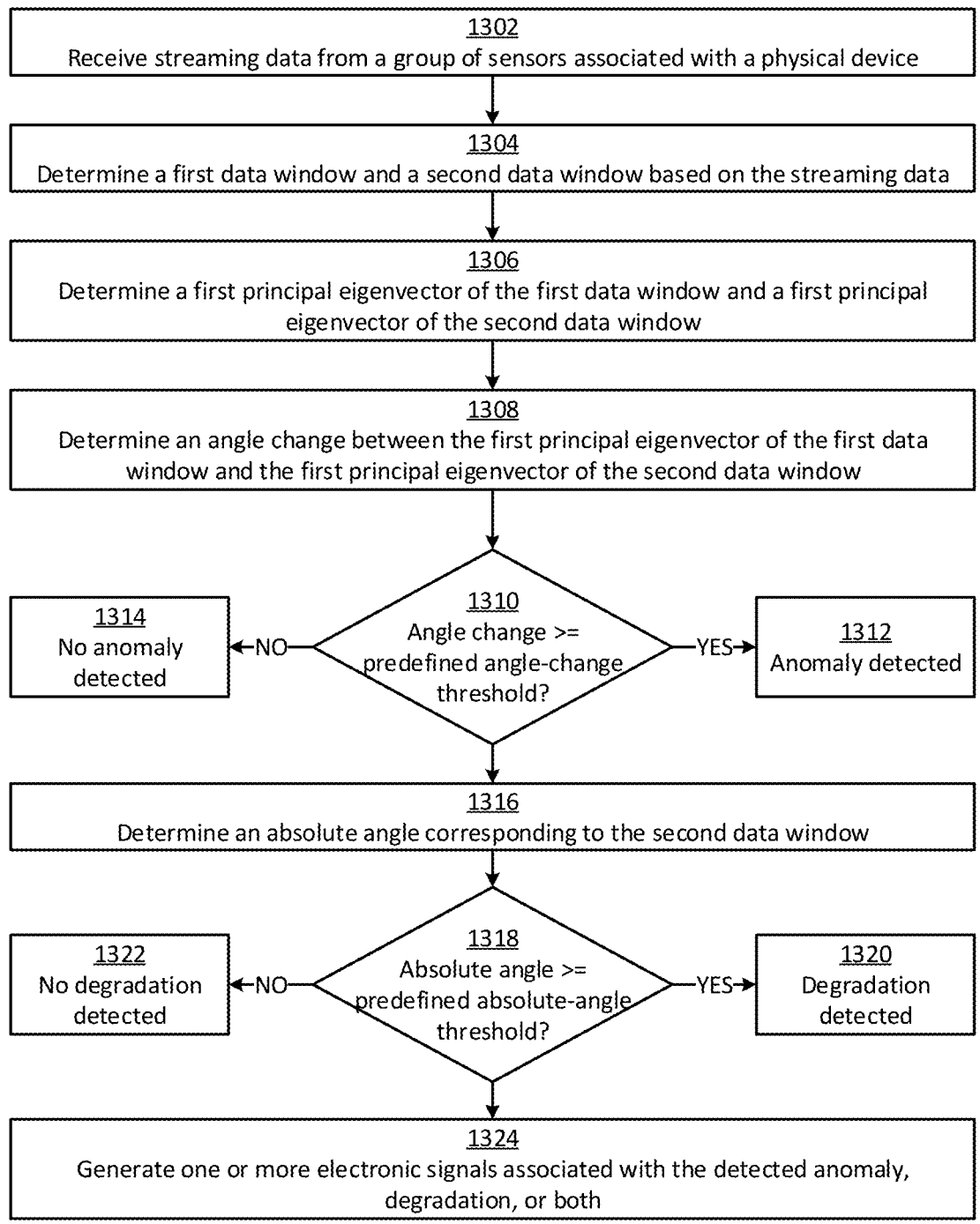
FIG. 13 depicts a flow chart of an example of a process for detecting and mitigating anomalies and degradation associated with devices and their operations according to some aspects.

FIG. 13 depicts a flow chart of an example of a process for detecting and mitigating anomalies and degradation associated with physical devices according to some aspects. Other examples can involve more operations, fewer operations, different operations, or a different order of the operations shown in FIG. 13.

In block 1302, a processor receives streaming data from a group of sensors associated with a physical device. The streaming data can be multidimensional data that includes multiple data points spanning a period of time. For example, the streaming data can be time series data having magnitude and time dimensions.

The group of sensors can include any number and combination of the sensor types described above. In some examples, the sensors can be configured for sensing one or more characteristics of the physical device. This can enable the processor to detect anomalies and degradation associated with the physical device based on the streaming data from the sensors. As one particular example, the physical device can include a machine. A machine is a mechanically, electrically, or electronically operated device for performing a task. Examples of machines can include vehicles, furnaces, pumps, heaters, wind turbines, computers, or any combination of these. The sensors can detect one or more characteristics of the machine and transmit streaming data indicating the one or more characteristics to the processor.

In other examples, the sensors can be associated with the physical device in other ways. For instance, the physical device can itself be a sensor among the group of sensors. This can enable the processor to detect anomalies and degradation associated with the sensor based on the streaming data.

In block 1304, the processor determines a first data window and a second data window based on the streaming data. The processor can determine a data window by applying a window function to the streaming data. The window function can have a window length constraining the number of consecutive data points in the streaming data to be included in a data window. For example, a window length of 9 may generate a data window having 9 consecutive data points from the streaming data.

The processor can generate the first data window by applying the window function to the streaming data. The first data window can span a first timespan and have a predefined number of consecutive data points from the streaming data, where the predefined number of consecutive data points depends on the window length associated with the window function. For example, the first data window can span 10 milliseconds (ms) and have 9 data points.

The processor can also generate the second data window by applying the window function to the streaming data. The second data window can span a second timespan that is subsequent to the first timespan, thereby making the second timespan more current in time than the first timespan. The second data window can also have the predefined number of consecutive data points from the streaming data. For example, the second data window can also span 10 milliseconds (ms) and have 9 data points. The second data window has at least one data point that is different from the data points in the first data window. That is, the second data window includes at least one data point that is not included in the first data window. The second data window may also have at least one data point that is included in the first data window, such that the second data window is partially overlapping with the first data window.

In some examples, the processor can apply a sliding window based on the window function to the streaming data at successive time intervals to generate the first data window and the second data window, such that the first and second data windows being consecutive data windows. These consecutive data windows may differ by only a single data point.

In block 1306, the processor determines a first principal eigenvector of the first data window and a first principal eigenvector of the second data window. The first principal eigenvector of the first data window can characterize a first subspace associated with the first data window, and the first principal eigenvector of the second data window can characterize a second subspace associated with the second data window.

In some examples, the processor can determine a first principal eigenvector of a data window by performing principal component analysis (PCA) on the data window. For example, the processor can determine the first principal eigenvector of the first data window by performing PCA on the first data window, and can determine the first principal eigenvector of the second data window by performing PCA on the second data window.

In some examples, the processor may not determine any other eigenvectors of a data window besides the first principal eigenvector. For example, the processor can determine the first principal eigenvector of the first data window without determining any other eigenvectors of the first data window. Likewise, the processor can determine the first principal eigenvector of the second data window without determining any other eigenvectors of the second data window. This can significantly reduce processing times and consumption of computing resources (e.g., processing power and memory), since the processor only determines the eigenvectors used to implement the rest of the process and avoids determining other eigenvectors that may be extraneous.

In block 1308, the processor determines an angle change between the first principal eigenvector of the first data window and the first principal eigenvector of the second data window. For example, the processor can apply the following equation to determine the angle change:

$$\theta_i = \cos^{-1}\left(\frac{v_{i-1} \cdot v_i}{\|v_{i-1}\|\|v_i\|}\right)$$

where $v_{i-1}$ is the first principal eigenvector of the first data window, $v_i$ is the first principal eigenvector of the second data window, and $\theta_i$ is the angle change.

In block 1310, the processor determines if the angle change is greater than or equal to a predefined angle-change threshold. For example, the processor can compare an angle change of 3% against a predefined angle-change threshold of 2% to determine that the angle change exceeds the predefined angle-change threshold.

If the processor determines that the angle change meets or exceeds the predefined angle-change threshold, then the processor can detect an anomaly associated with the physical device at block 1312. Examples of the anomaly can include an error or failure of the physical device. If the processor determines that the angle change is below the predefined angle-change threshold, the processor can determine that no anomaly has occurred at block 1314.

Figure 14:
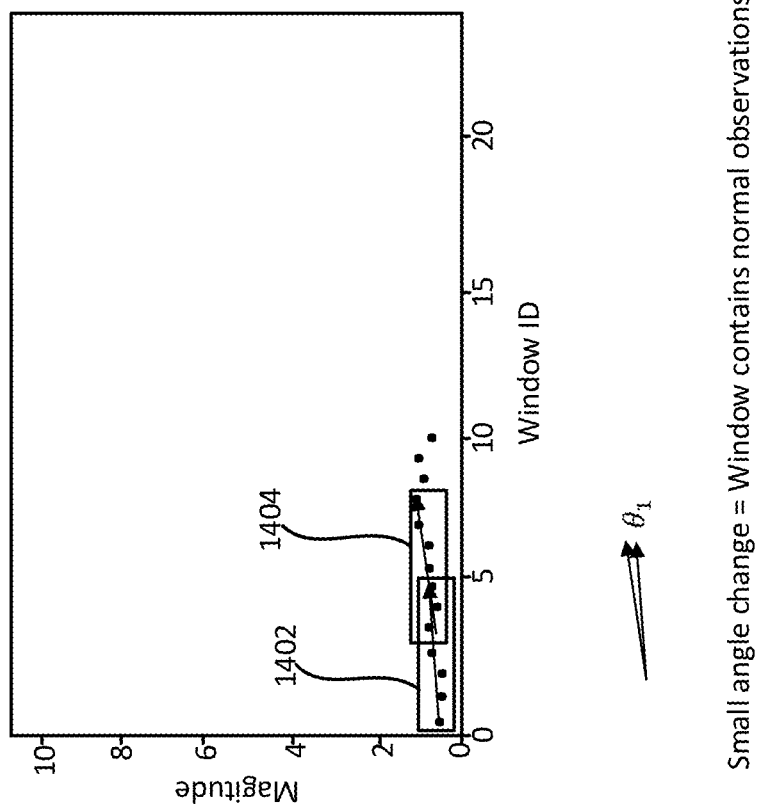
FIG. 14 depicts an example of a small angle change between two data windows according to some aspects.
Figure 15:
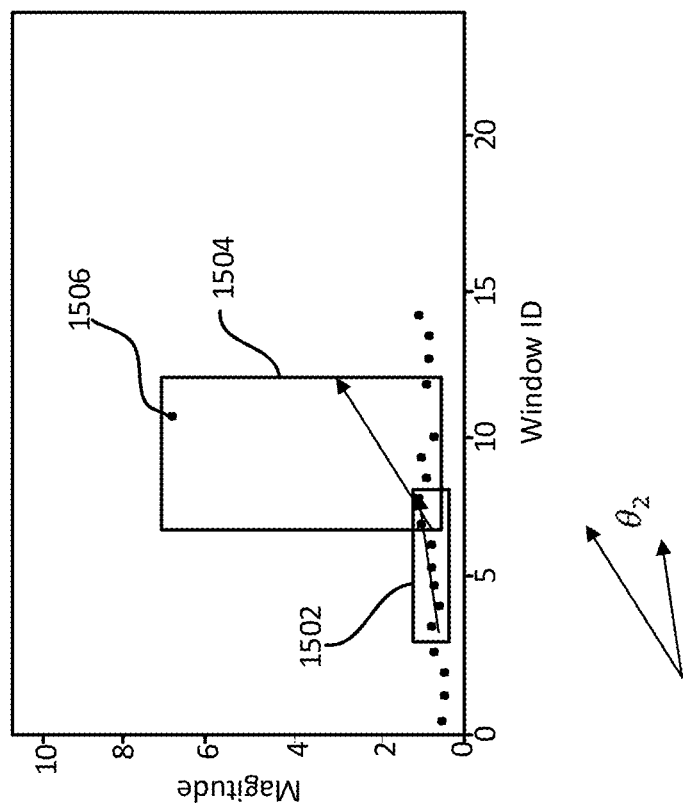
FIG. 15 depicts an example of a large angle change between two data windows according to some aspects.

As a particular example, FIG. 14 shows a first data window 1402 with 7 data points and a second data window 1404 with 7 data points. Three of the data points overlap between the first data window 1402 and the second data windows 1404. A black arrow in the first data window 1402 represents an angle of the first data window 1402, and a black arrow in the second data window 1404 represents an angle of the second data window 1402. As shown, the angle change ($\theta_1$) is relatively small, which can indicate that one or both of the data windows contain normal observations. In contrast, a large change in these angles can indicate an anomaly in one or both of the data windows. For example, FIG. 15 shows a first data window 1502 with 7 data points and a second data window 1504 with 7 data points. Two of the data points overlap between the first data window 1502 and the second data windows 1504. A black arrow in the first data window 1502 represents an angle of the first data window 1502, and a black arrow in the second data window 1504 represents an angle of the second data window 1402. As shown, the angle change ($\theta_2$) is relatively large as a result of an abnormal observation 1506 (a data point value outside a normal range) in the second data window 1506. This large angle change can be indicative of an anomaly. Using these principles, the processor can detect anomalies associated with the physical device by comparing angle changes between data windows (e.g., successive data-windows) to a predefined angle-change threshold. This can be significantly faster and consume fewer computing resources than alternative approaches, such as comparing each individual data-point value in a particular data window to a threshold value.

Referring back to FIG. 13, in some examples the process can continue to block 1316. In block 1316, the processor determines an absolute angle corresponding to the second data window. For example, the processor can compare the first principal eigenvector for the second data window to a baseline unit vector, to determine an absolute angle associated with the second data window. A baseline unit vector is a unit vector usable as a baseline from which the absolute angle can be determined. In one particular example, the processor can perform this comparison by applying the following equation to determine the absolute angle:

$$\delta_i = \cos^{-1}\left(\frac{e \cdot v_i}{\|v_i\|}\right)$$

where $v_i$ is the first principal eigenvector of the second data window, e is the baseline unit vector, and $\delta_i$ is the absolute angle.

Figure 16:
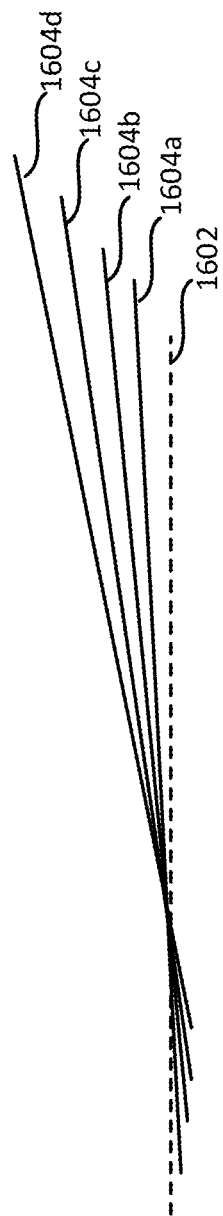
FIG. 16 depicts an example of absolute angle changes associated with multiple data windows according to some aspects.
Figure 17:
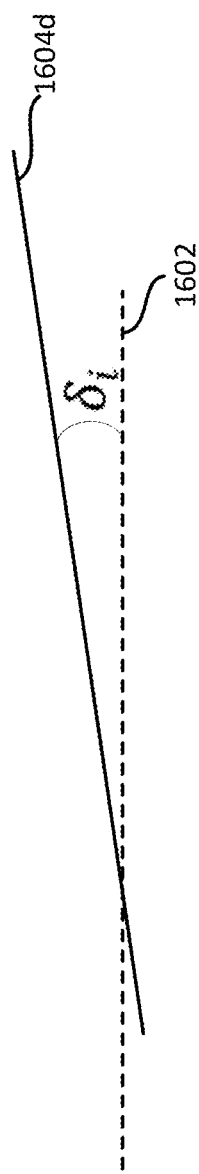
FIG. 17 depicts an example of an absolute angle change associated with a data window according to some aspects.

As a particular example, FIG. 16 shows a dashed line representing a baseline unit vector 1602. Also shown are four solid lines representing first principal eigenvectors 1604a-d corresponding to four data windows. FIG. 17 shows an example of an absolute angle ($\delta_i$) between the first principal eigenvector 1604d of one of the data windows and the baseline unit vector 1602. The processor may be able to determine this absolute angle based on the first principal eigenvector 1604d and the baseline unit vector 1602, for example by applying the equation described above.

Referring back to FIG. 13, in block 1318 the processor determines if the absolute angle is greater than or equal to a predefined absolute-angle threshold. For example, the processor can compare an absolute angle of 10% against a predefined absolute-angle threshold of 8% to determine that the absolute angle exceeds the predefined absolute-angle threshold.

If the processor determines that the absolute angle meets or exceeds the predefined absolute-angle threshold, then the processor can detect a degradation associated with the physical device at block 1320. If the processor determines that the absolute angle is below the predefined absolute-angle threshold, the processor can determine that no degradation has occurred at block 1322.

In some examples, the process can continue to block 1324. In block 1324, the processor generates one or more electronic signals associated with a detected anomaly, detected degradation, or both. For example, the processor can generate and transmit one or more electronic signals indicating at least one of the anomaly or the degradation associated with the physical device.

In some examples, the electronic signals can be configured to cause an operational problem associated with a detected anomaly to be mitigated. For example, the processor can generate and transmit an electronic communication over a network (e.g., a local area network or the Internet) to a remote computing device, where the electronic communication is configured to cause the remote computing device to assist with mitigating an anomaly.

In some such examples, the remote computing device can assist with mitigating the anomaly by determining a type and severity of the anomaly based on the electronic communication, determining a countermeasure based on the type and severity of the anomaly, and implementing the countermeasure. The remote computing device may determine the countermeasure based on a predefined mapping of anomaly types and severities to countermeasures. For example, if the anomaly is a result of outdated software, the remote computing device can apply a software update to the physical device to mitigate the anomaly. If the anomaly is a result of overheating, the remote computing device can operate a fan or other cooling system to mitigate the anomaly. Or, if the anomaly is a result of overheating, the remote computing device can transmit one or more control signals to the physical device for causing the physical device to enter an idle state or shutdown for a time period. If the anomaly is a result of pressure buildup, the remote computing device can operate a valve to reduce pressure and thereby mitigate the anomaly. If the anomaly is a result of an improper setting, the remote computing device can change an operational setting of the physical device to mitigate the anomaly. Numerous other countermeasures are possible depending on the type and severity of the anomaly. Additionally or alternatively, the remote computing device can assist with mitigating the anomaly in some examples by generating an alert notifying a user of the remote computing device about anomaly. This may enable the user to implement a countermeasure to mitigate the anomaly.

In some examples, the electronic signals can be display signals for generating a graphical user interface (GUI) on a display device, such as a liquid crystal display or light-emitting diode display. The GUI can include an alert for notifying a user about anomaly or degradation. This may enable the user to implement a countermeasure to mitigate the anomaly or degradation. An example of a countermeasure for mitigating degradation of the physical object may include replacing a part of the physical object or replacing the physical object as a whole.

Figure 18:
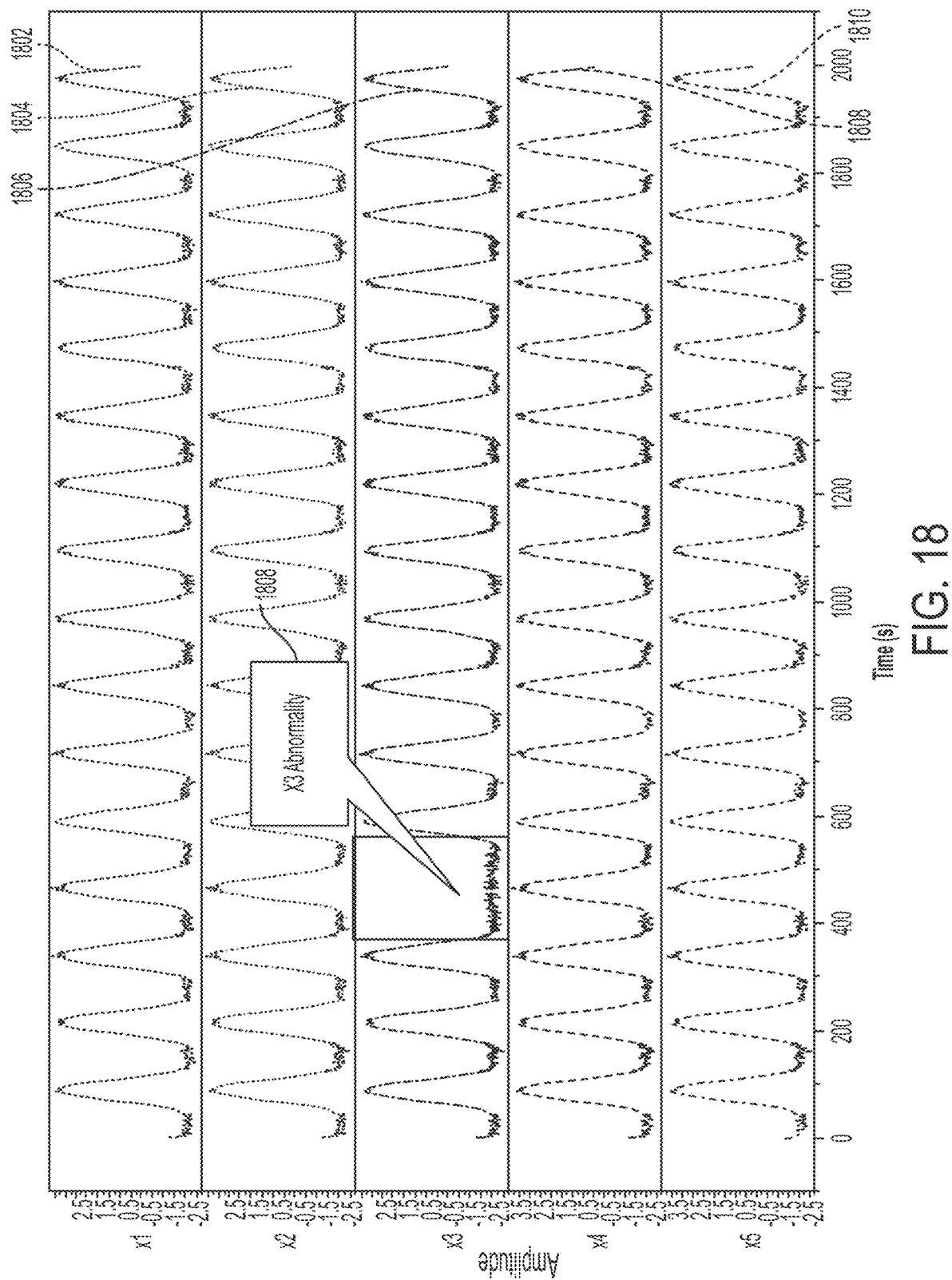
FIG. 18 depicts an example of data streams according to some aspects.
Figure 19:
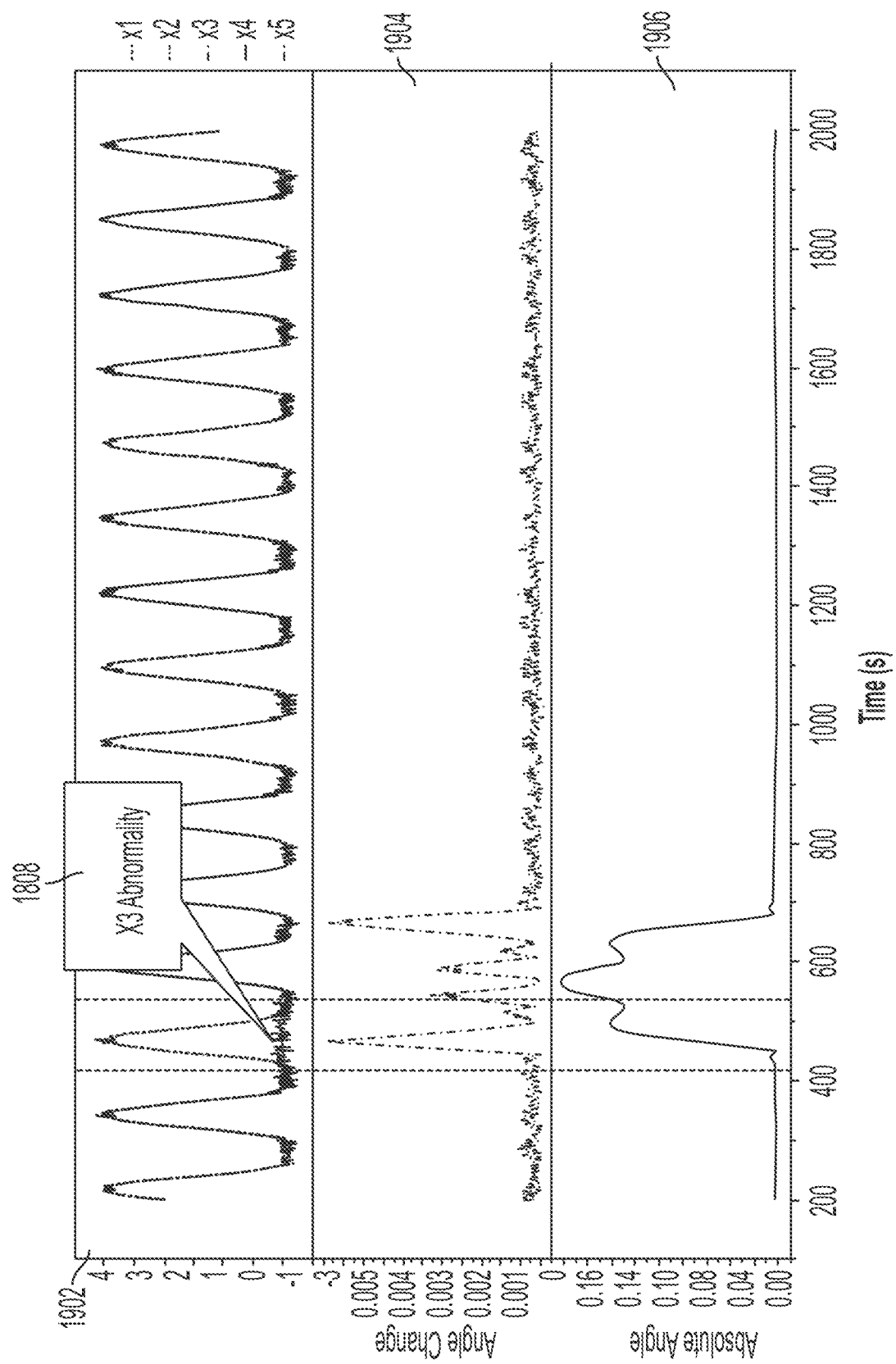
FIG. 19 depicts an example of angle changes and absolute angle changes associated with the data streams of FIG. 18 according to some aspects.

Some more specific examples of the process of FIG. 13 being applied in various contexts are described below with reference to FIGS. 18-26. In particular, FIG. 18 depicts an example of multiple data streams 1802-1810 according to some aspects. The data streams 1802-1810 can be received from respective sensors, designated as x1-x5 in FIG. 18, which are associated with a physical device. For example, data stream 1802 can be received from a first sensor (x1), data stream 1804 can be received from a second sensor (x2), data stream 1806 can be received from a third sensor (x3), data stream 1808 can be received from a fourth sensor (x4), and data stream 1810 can be received from a fifth sensor (x5). In the example shown in FIG. 18, there is an abnormality 1808 in the data stream 1806, between the timespan of 425 seconds and 510 seconds. This abnormality 1808 can be indicative of an anomaly or degradation associated with the physical device. Some examples of the present disclosure can detect such issues using one or more of the processes described above. For example, FIG. 19 includes a graph 1902 depicting the data streams 1802-1806 overlaying one another to highlight the abnormality 1808. Another graph 1904 depicts angle changes between first principal components of consecutive data windows. As shown, a significant angle change occurs roughly 20 seconds after the beginning of the abnormality 1808. A system of the present disclosure can detect such angle changes and responsively determine that an anomaly is occurring or has occurred on the physical device. FIG. 19 also shows another graph 1906 depicting absolute angle changes between first principal components of data windows and a baseline value. As shown, a significant change in absolute angle occurs roughly 20 seconds after the beginning of the abnormality 1808. A system of the present disclosure can detect such absolute angle changes and responsively determine that a degradation of the physical device has occurred.

Figure 20:
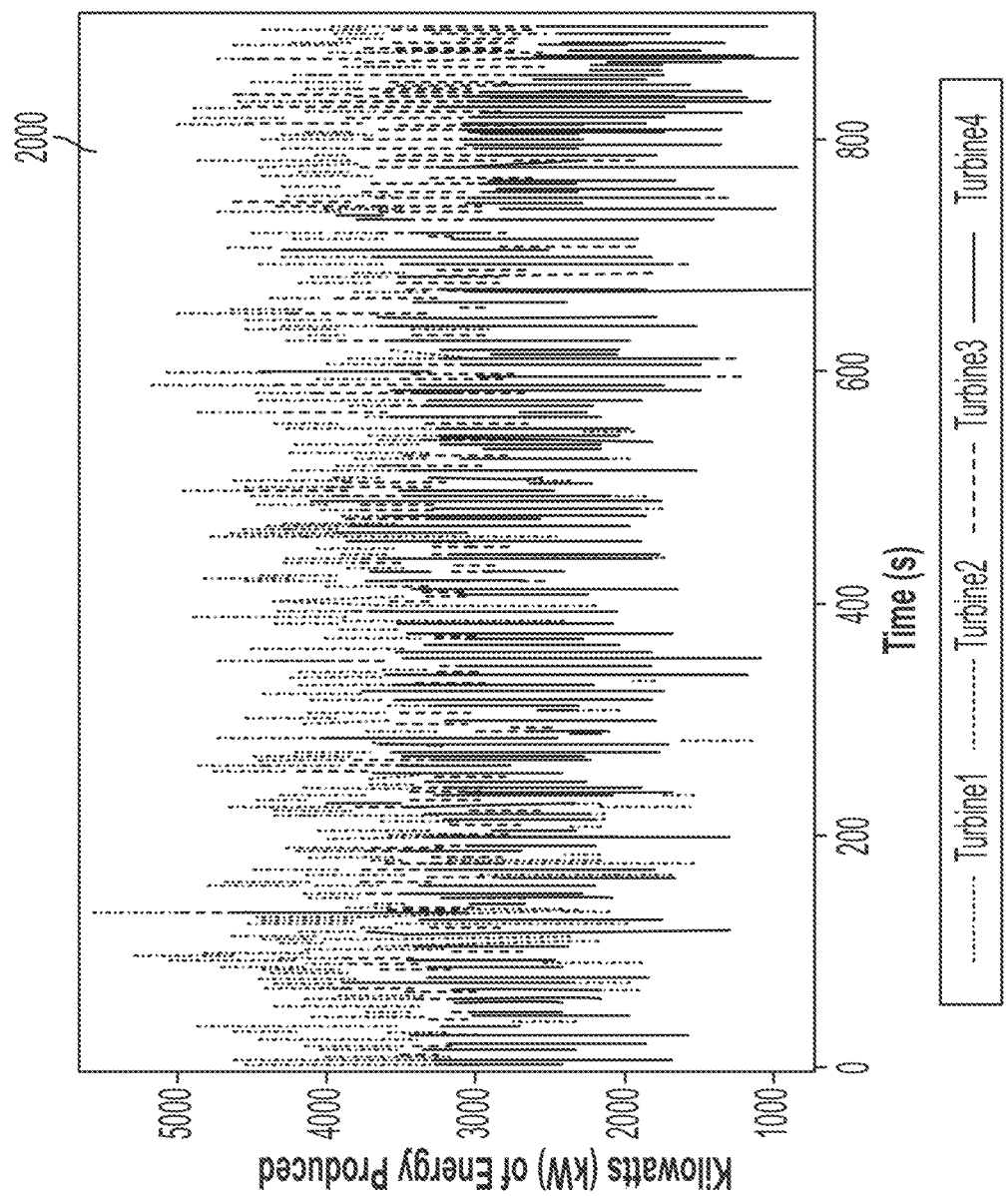
FIG. 20 depicts an example of data streams associated with turbines according to some aspects.

FIG. 20 depicts an example of data streams associated with multiple turbines (e.g., wind or water turbines) according to some aspects. The turbines may be in the same physical environment, such as the same wind farm, in some examples. As shown, graph 2000 depicts four data streams overlying one another. The four data streams are received from sensors coupled to four turbines for measuring electrical energy produced by the four turbines. But other examples may involve other types of sensors for measuring other characteristics of the turbines. Given the overlapping streaming data, it can be challenging to visually inspect the graph 200 do determine if a degradation or anomaly has occurred in relation to any of the turbines. But some examples of the present disclosure can automatically detect such issues using one or more of the processes described above. For example, FIG. 21 includes a graph 2100 showing first principal components derived from the data streams associated with the four turbines. Line 2102 corresponds to the first principal component values associated with the fourth turbine. As shown, line 2102 has a steep drop-off between 600 seconds and 700 seconds. In some examples, the first principal component values of the four turbines can be compared to one another to detect such drop-offs or other significant deviations. This may be the result of an anomaly (e.g., a failure) associated with the fourth turbine.

Figure 21:
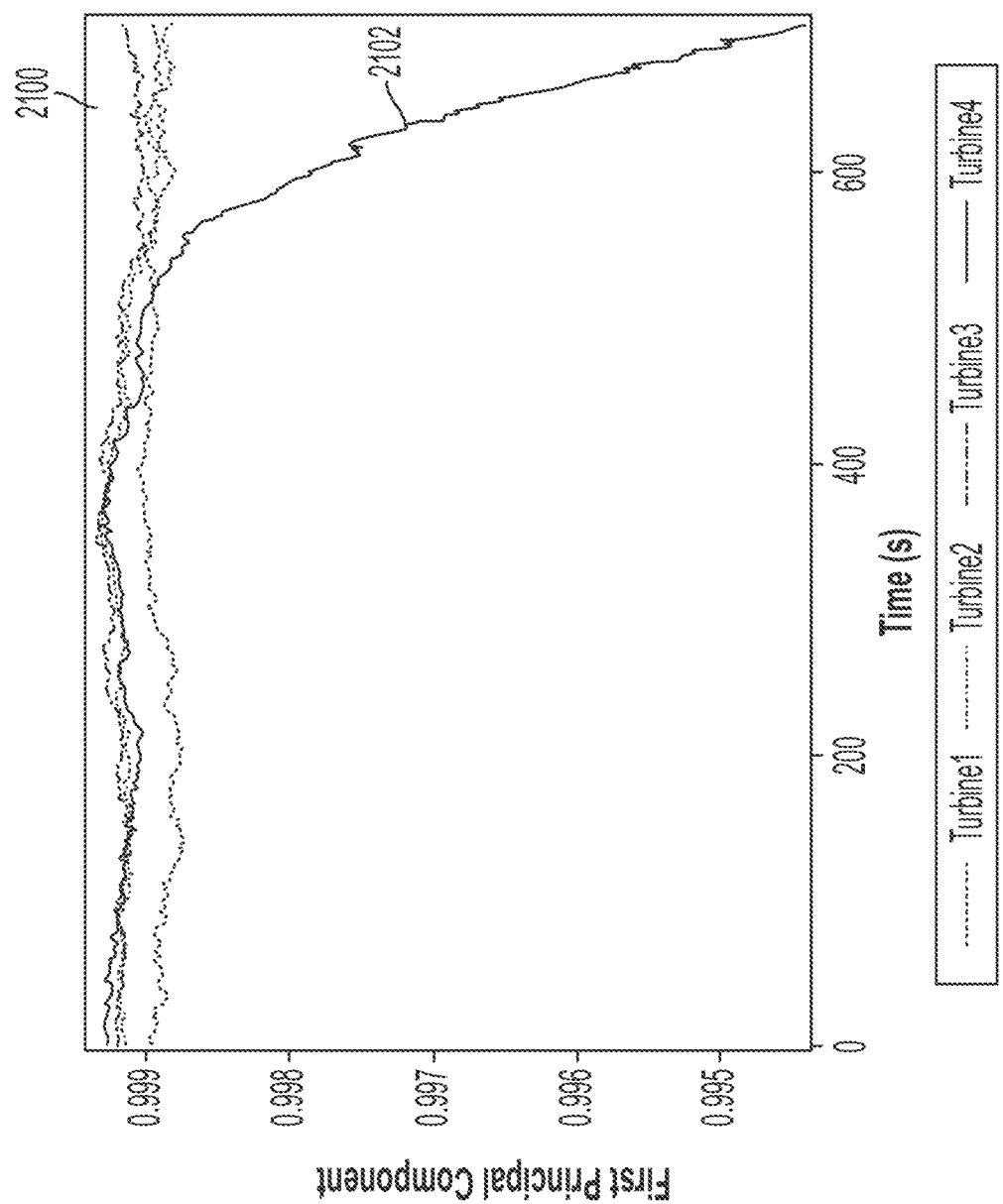
FIG. 21 depicts an example of a first principal component associated with each of the multiple turbines according to some aspects.
Figure 22:
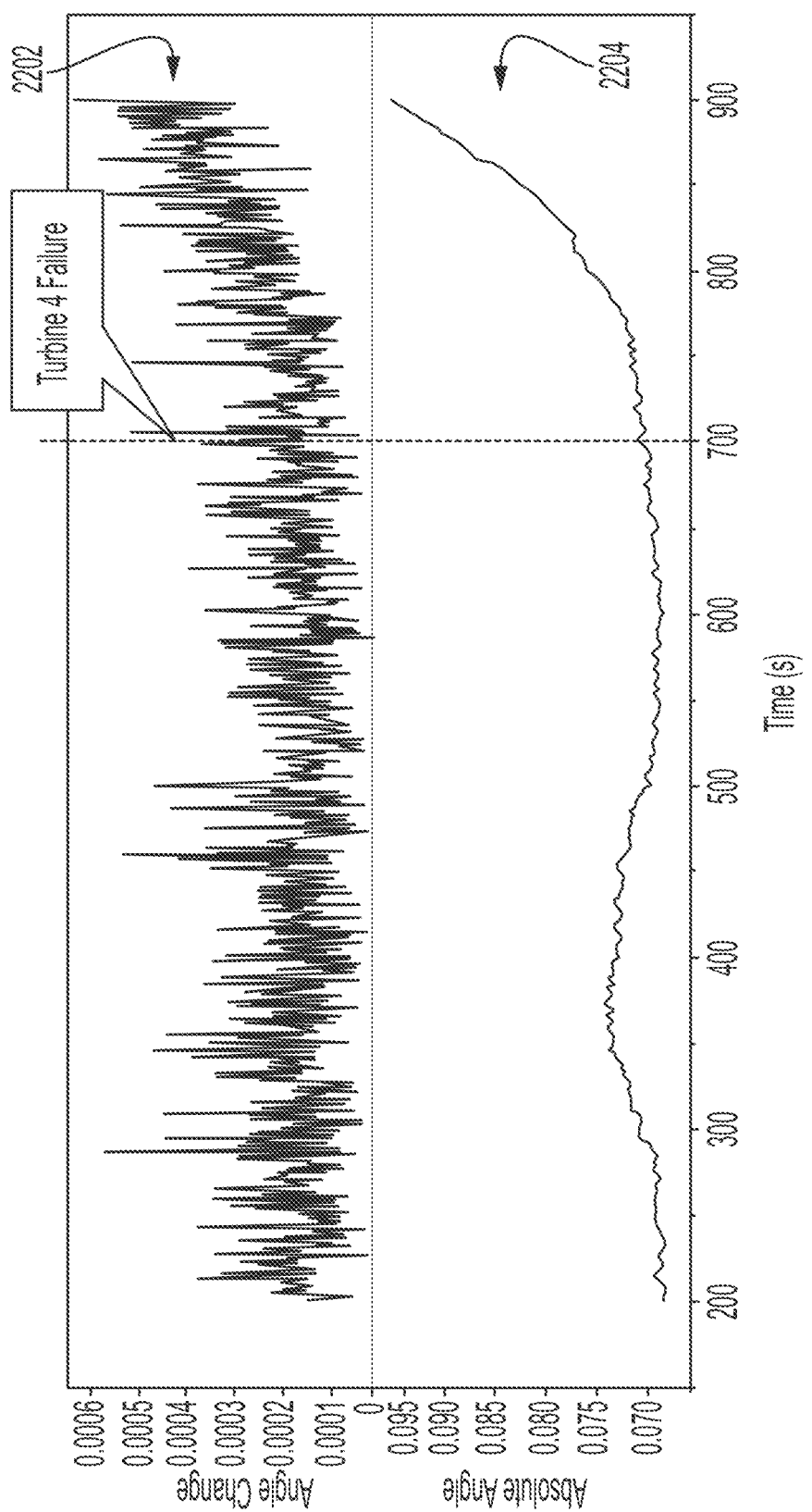
FIG. 22 depicts an example of angle changes and absolute angles associated with the first principal components of FIG. 21 according to some aspects.

The steep drop-off in the first principal component values shown in FIG. 21 may also result in significant angle changes between consecutive values of the first principal component values. An example of this is shown in graph 2202 of FIG. 22, which depicts progressively increasing angle changes beginning at around 700 seconds. In some examples, a system of the present disclosure can detect such angle changes and responsively determine that an anomaly is occurring or has occurred on the physical device. This may allow for anomalies to be detected for a turbine by only tracking a single parameter (e.g., the angle change) related to that turbine, rather that comparing information about multiple turbines to one another, which can be slower and more computationally intensive.

Additionally or alternatively, the steep drop-off of the first principal component values may result in significant changes to absolute angles between the first principal component values and a baseline value. An example of this is shown in graph 2204, which depicts progressively increasing absolute angles beginning at around 700 seconds. A system of the present disclosure can detect such absolute angle changes and responsively determine that a degradation of the physical device has occurred.

Figure 23:
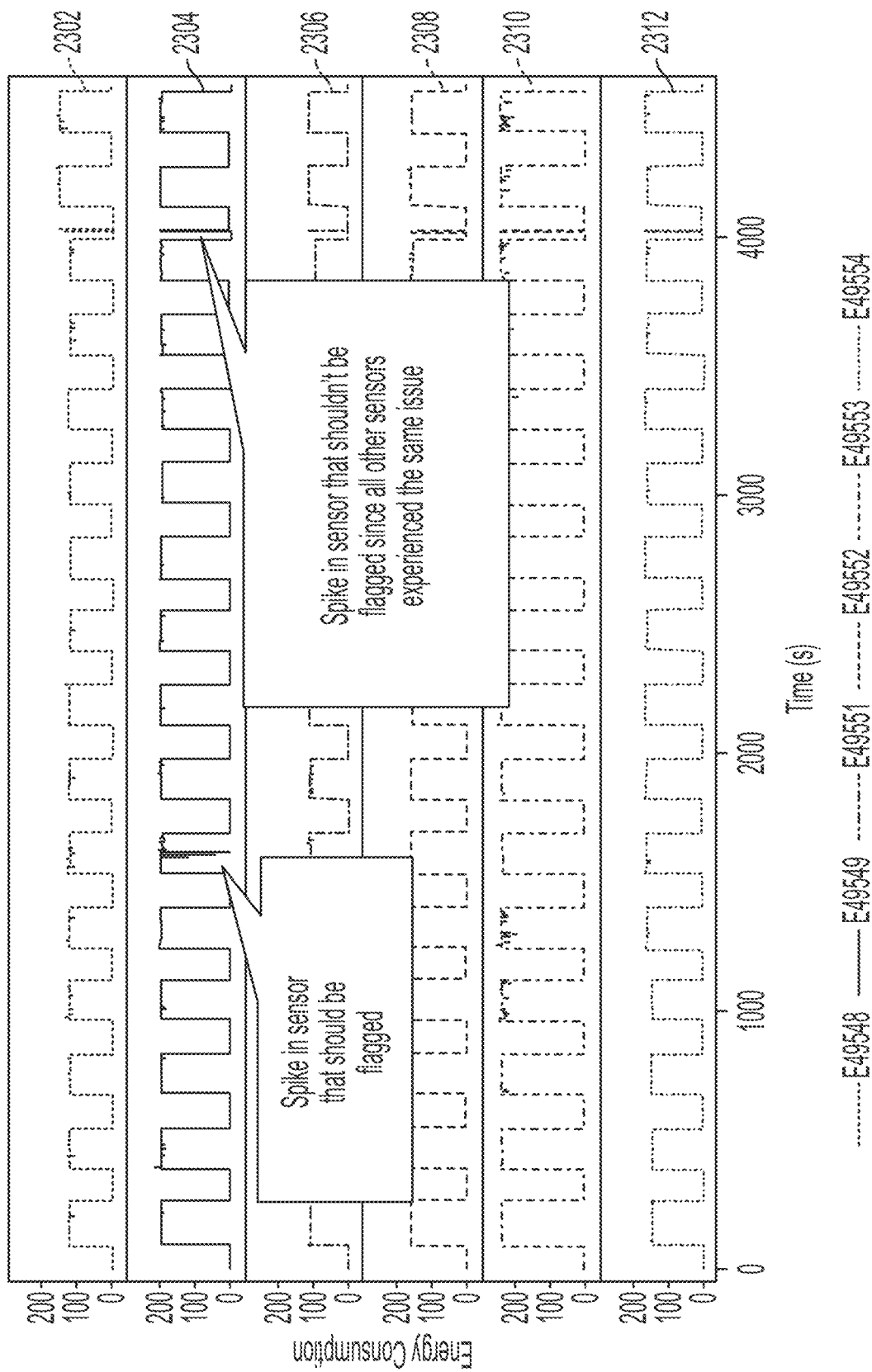
FIG. 23 depicts an example of data streams from multiple sensors measuring the energy consumption of multiple lights in an environment according to some aspects.
Figure 24:
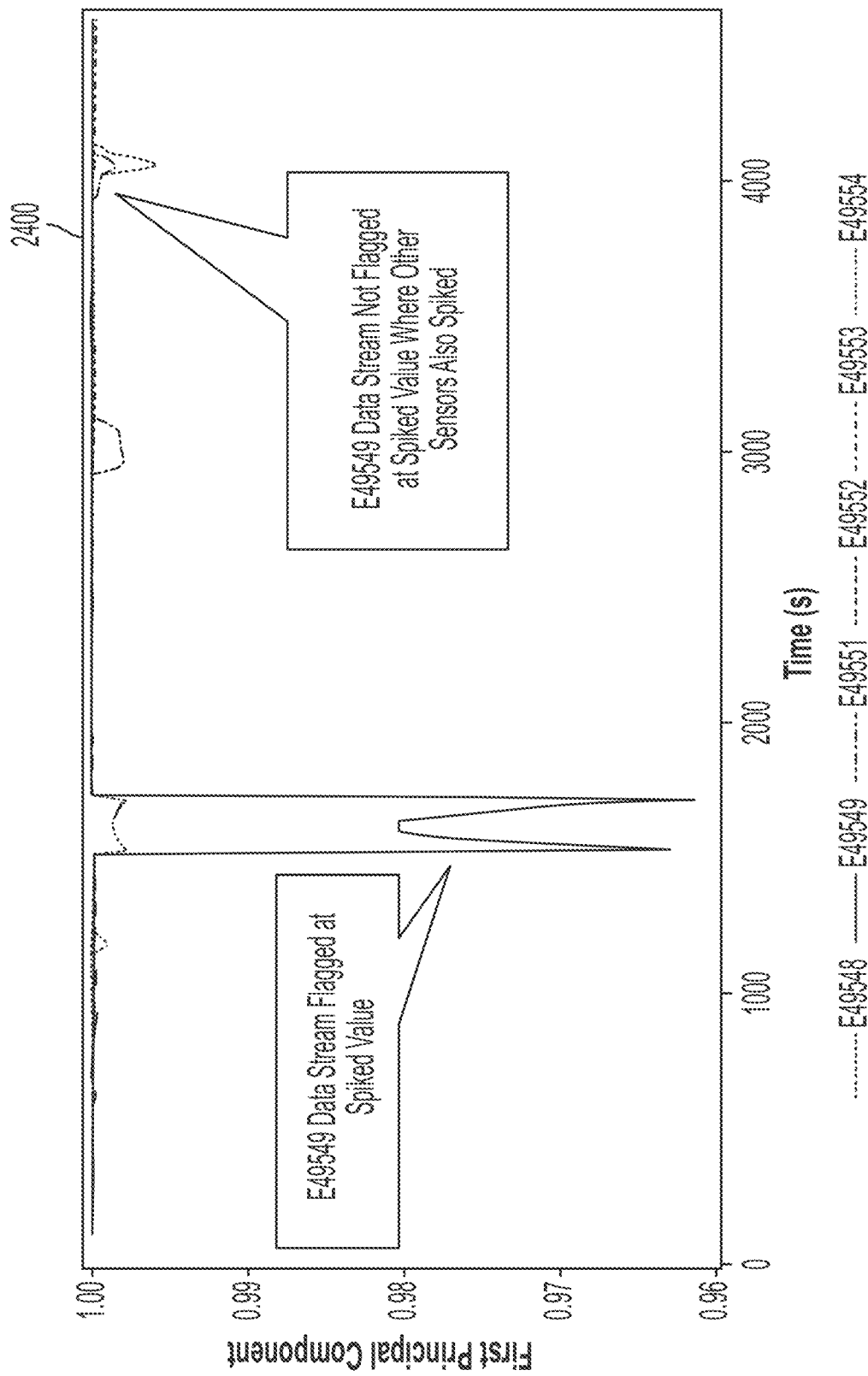
FIG. 24 depicts an example of first principal component values associated with each of the lights according to some aspects.
Figure 25:
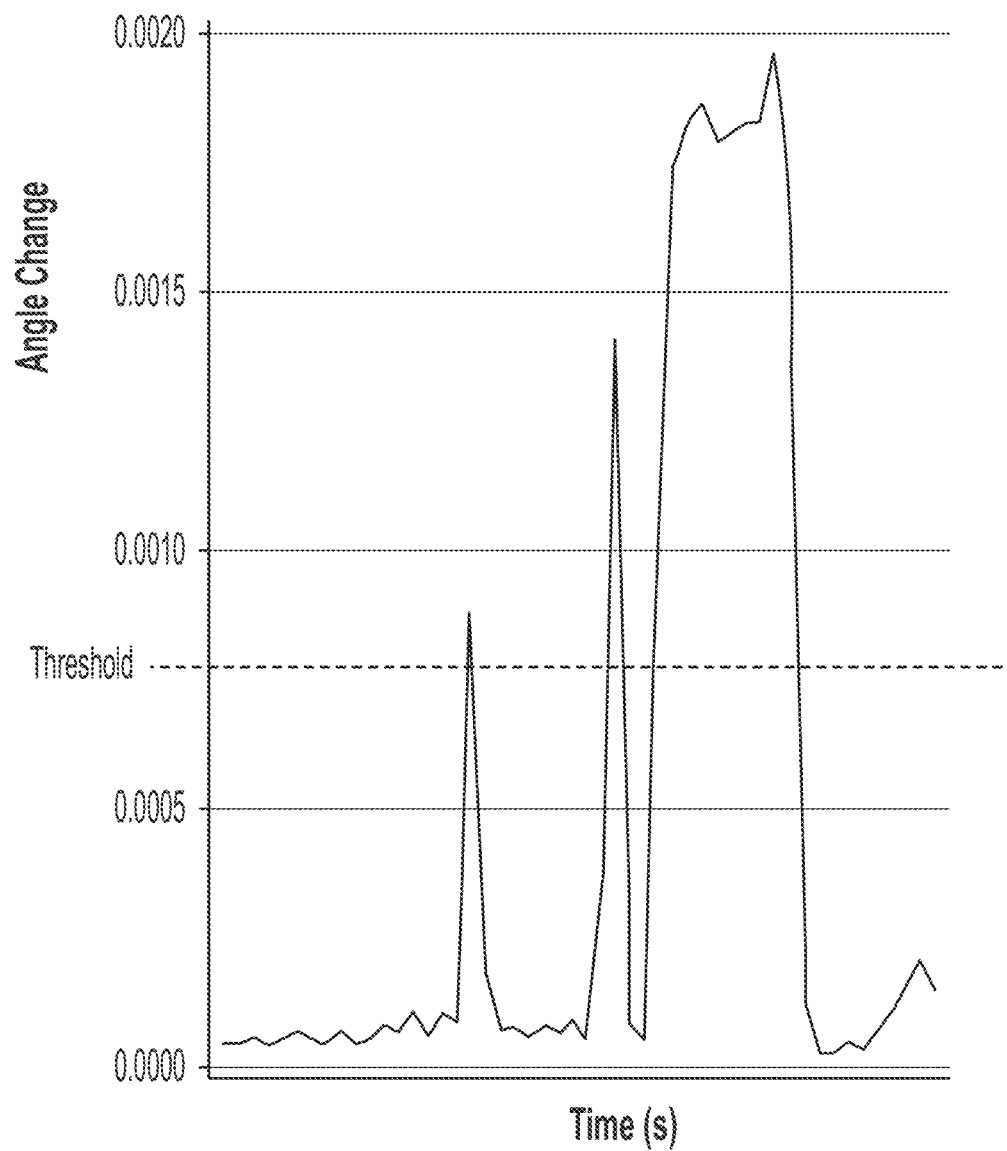
FIG. 25 depicts an example of angle changes associated with a first abnormality that is specific to a particular physical device according to some aspects.
Figure 26:
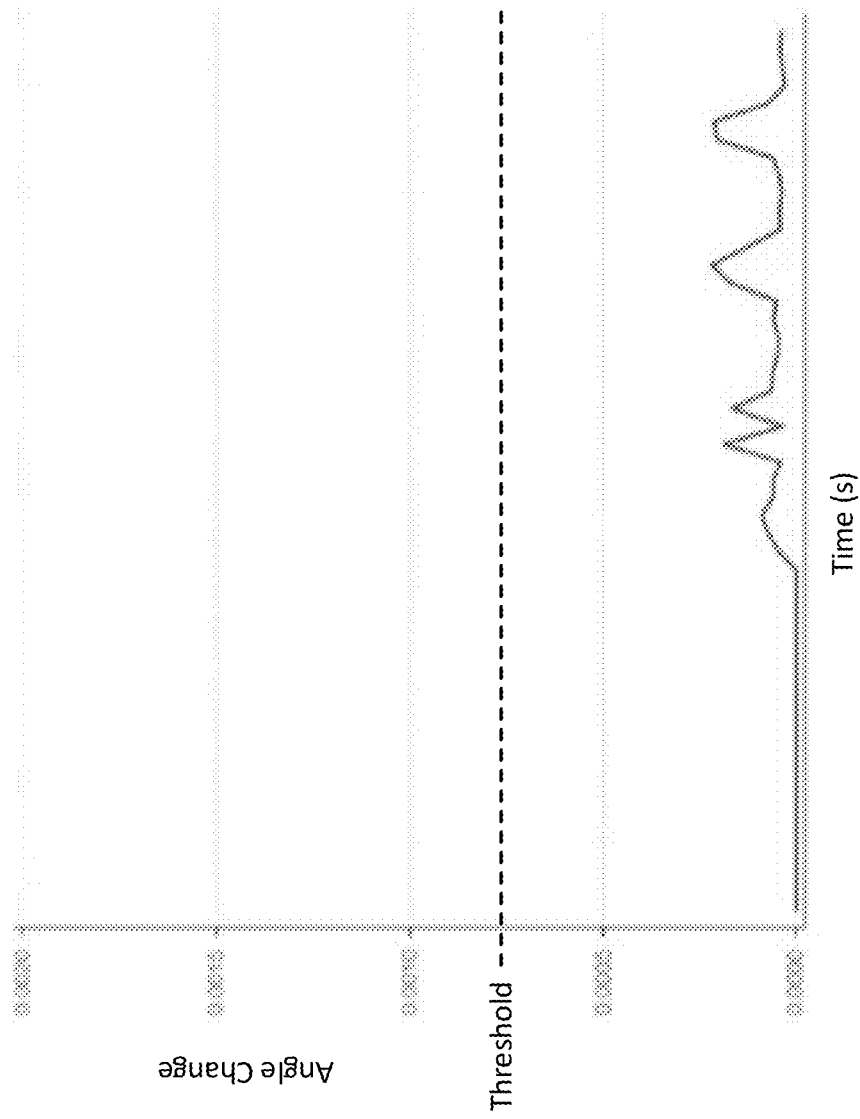
FIG. 26 depicts an example of angle changes associated with a second abnormality that is not specific to a particular physical device according to some aspects.

FIG. 23 depicts an example of data streams 2302-2312 from multiple sensors measuring the energy consumption of multiple light sources in an environment (e.g., a building or parking lot) according to some aspects. The data streams 2302-2312 are received from sensors coupled to light sources for measuring electrical energy consumed by the light sources. But other examples may involve other types of sensors for measuring other characteristics of the light sources. In the example shown in FIG. 23, there is a first abnormality in the data stream 2304 (corresponding to sensor E49549) at around the 1600 second mark. The first abnormality can be indicative of an anomaly or degradation associated with a corresponding light source. There is also a second abnormality in the data stream 2304 at around the 4000 second mark. The second abnormality may arise from a more holistic issue, such as a power surge, impacting multiple of the data streams 2302-2312. Some examples of the present disclosure can differentiate between these types of abnormalities, so that issues specific to a particular light source can be detected and more holistic issues can be ignored. For example, FIG. 24 includes a graph 2400 depicting first principal components derived from the data streams associated with the light sources. The first principal components are overlaying one another on the graph 2400. As shown, there are significant variations in the first principal component associated with the E49549 data stream at around the 1600 second mark corresponding to the first abnormality. This may produce angle changes above a predefined angle-change threshold, for example as shown in FIG. 25, that can be detected by some examples of the present disclosure. In contrast, there are less pronounced variations in the first principal component associated with the E49549 data stream at around the 4000 second mark corresponding to the second abnormality. This may yield angle changes below the predefined angle-change threshold, for example as shown in FIG. 26, that can be ignored by some examples of the present disclosure. In this way, issues specific to a particular physical device can be distinguished from environmental issues affecting multiple physical devices, allowing for more precise monitoring of individual physical devices.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
a processor; and
a memory device comprising instructions that are executable by the processor for causing the processor to:
receive streaming data from a plurality of sensors, the streaming data being multidimensional data that includes a plurality of data points spanning a period of time;
determine a first data window by applying a window function to the streaming data, the first data window spanning a first timespan and having a predefined number of consecutive data points from the streaming data;
determine a first principal eigenvector of the first data window, without determining any other eigenvectors of the first data window;
determine a second data window by applying the window function to the streaming data, the second data window spanning a second timespan that is subsequent to the first timespan and having the predefined number of consecutive data points from the streaming data, wherein the second data window includes at least one data point that is different from the first data window;
determine a first principal eigenvector of the second data window, without determining any other eigenvectors of the second data window;
determine an angle change between first principal eigenvector of the first data window and the first principal eigenvector of the second data window;
determine that the angle change exceeds a predefined angle-change threshold;
detect an anomaly associated with a physical device based on determining that the angle change exceeds the predefined angle-change threshold, the physical device being associated with the plurality of sensors;
compare the first principal eigenvector for the second data window to a baseline unit vector to determine an absolute angle associated with the second data window;
determine that the absolute angle exceeds a predefined absolute-angle threshold;
detect a degradation associated with the physical device based on determining that the absolute angle exceeds the predefined absolute-angle threshold; and
generate one or more electronic signals indicating at least one of the anomaly or the degradation associated with the physical device.

2. The system of claim 1, wherein the memory device further comprises instructions that are executable by the processor for causing the processor to determine the absolute angle by:

determining a product of (i) the base unit vector and (ii) the first principal eigenvector of the second data window;
determining a norm of the first principal eigenvector of the second data window;
determining a result of dividing the product by the norm; and
determining an inverse cosine of the result.

3. The system of claim 1, wherein the memory device further comprises instructions that are executable by the processor for causing the processor to:
determine the first principal eigenvector of the first data window by performing principal component analysis on the first data window; and
determine the first principal eigenvector of the second data window by performing principal component analysis on the second data window.

4. The system of claim 1, wherein the physical device is a sensor among the plurality of sensors, or the physical device is a machine to which the plurality of sensors are coupled for sensing characteristics of the machine.

5. The system of claim 1, wherein the anomaly is indicative of an operational problem with the physical device that is distinct from the degradation.

6. The system of claim 5, wherein the memory device further comprises instructions that are executable by the processor for causing the processor to generate an electronic communication configured to cause the operational problem to be mitigated.

7. The system of claim 6, wherein the memory device further comprises instructions that are executable by the processor for causing the processor to transmit the electronic communication over a network to a remote computing device, the electronic communication being configured to cause the remote computing device to assist with mitigating the operational problem.

8. The system of claim 1, wherein the memory device further comprises instructions that are executable by the processor for causing the processor to apply a sliding window based on the window function to the streaming data at successive time intervals to generate the first data window and the second data window.

9. The system of claim 1, wherein the memory device further comprises instructions that are executable by the processor for causing the processor to determine the angle change by:
determining a first product of (i) the first principal eigenvector of the first data window and (ii) the first principal eigenvector of the second data window;
determining a second product of (i) a norm of the first principal eigenvector of the first data window and (ii) a norm of the first principal eigenvector of the second data window;
determining a result of dividing the first product by the second product; and
determining an inverse cosine of the result.

10. A method comprising:
receiving, by a processor, streaming data from a plurality of sensors, the streaming data being multidimensional data that includes a plurality of data points spanning a period of time;
determining, by the processor, a first data window by applying a window function to the streaming data, the first data window spanning a first timespan and having a predefined number of consecutive data points from the streaming data;
determining, by the processor, a first principal eigenvector of the first data window, without determining any other eigenvectors of the first data window;
determining, by the processor, a second data window by applying the window function to the streaming data, the second data window spanning a second timespan that is subsequent to the first timespan and having the predefined number of consecutive data points from the streaming data, wherein the second data window includes at least one data point that is different from the first data window;
determining, by the processor, a first principal eigenvector of the second data window, without determining any other eigenvectors of the second data window;
determining, by the processor, an angle change between first principal eigenvector of the first data window and the first principal eigenvector of the second data window;
determining, by the processor, that the angle change exceeds a predefined angle-change threshold;
detecting, by the processor, an anomaly associated with a physical device based on determining that the angle change exceeds the predefined angle-change threshold, the physical device being associated with the plurality of sensors;
comparing, by the processor, the first principal eigenvector for the second data window to a baseline unit vector to determine an absolute angle associated with the second data window;
determining, by the processor, that the absolute angle exceeds a predefined absolute-angle threshold;
detecting, by the processor, a degradation associated with the physical device based on determining that the absolute angle exceeds the predefined absolute-angle threshold; and
generating, by the processor, one or more electronic signals indicating at least one of the anomaly or the degradation associated with the physical device.

11. The method of claim 10, further comprising determining the absolute angle by:
determining a product of (i) the base unit vector and (ii) the first principal eigenvector of the second data window;
determining a norm of the first principal eigenvector of the second data window;
determining a result of dividing the product by the norm; and
determining an inverse cosine of the result.

12. The method of claim 10, further comprising:
determine the first principal eigenvector of the first data window by performing principal component analysis on the first data window; and
determine the first principal eigenvector of the second data window by performing principal component analysis on the second data window.

13. The method of claim 10, wherein the physical device is a sensor among the plurality of sensors, or the physical device is a machine to which the plurality of sensors are coupled for sensing characteristics of the machine.

14. The method of claim 10, wherein the anomaly is indicative of an operational problem with the physical device that is distinct from the degradation.

15. The method of claim 14, further comprising generating an electronic communication configured to cause the operational problem to be mitigated.

16. The method of claim 15, further comprising transmitting the electronic communication over a network to a remote computing device, the electronic communication being configured to cause the remote computing device to assist with mitigating the operational problem.

17. The method of claim 10, further comprising applying a sliding window based on the window function to the streaming data at successive time intervals to generate the first data window and the second data window.

18. The method of claim 10, further comprising determining the angle change by:
   determining a first product of (i) the first principal eigenvector of the first data window and (ii) the first principal eigenvector of the second data window;
   determining a second product of (i) a norm of the first principal eigenvector of the first data window and (ii) a norm of the first principal eigenvector of the second data window;
   determining a result of dividing the first product by the second product; and
   determining an inverse cosine of the result.

19. A non-transitory computer-readable medium comprising program code that is executable by a processor for causing the processor to:
   receive streaming data from a plurality of sensors, the streaming data being multidimensional data that includes a plurality of data points spanning a period of time;
   determine a first data window by applying a window function to the streaming data, the first data window spanning a first timespan and having a predefined number of consecutive data points from the streaming data;
   determine a first principal eigenvector of the first data window, without determining any other eigenvectors of the first data window;
   determine a second data window by applying the window function to the streaming data, the second data window spanning a second timespan that is subsequent to the first timespan and having the predefined number of consecutive data points from the streaming data, wherein the second data window includes at least one data point that is different from the first data window;
   determine a first principal eigenvector of the second data window, without determining any other eigenvectors of the second data window;
   determine an angle change between first principal eigenvector of the first data window and the first principal eigenvector of the second data window;
   determine that the angle change exceeds a predefined angle-change threshold;
   detect an anomaly associated with a physical device based on determining that the angle change exceeds the predefined angle-change threshold, the physical device being associated with the plurality of sensors;
   compare the first principal eigenvector for the second data window to a baseline unit vector to determine an absolute angle associated with the second data window;
   determine that the absolute angle exceeds a predefined absolute-angle threshold;
   detect a degradation associated with the physical device based on determining that the absolute angle exceeds the predefined absolute-angle threshold; and
   generate one or more electronic signals indicating at least one of the anomaly or the degradation associated with the physical device.

20. The non-transitory computer-readable medium of claim 19, further comprising program code that is executable by the processor for causing the processor to determine the absolute angle by:
   determining a product of (i) the base unit vector and (ii) the first principal eigenvector of the second data window;
   determining a norm of the first principal eigenvector of the second data window;
   determining a result of dividing the product by the norm; and
   determining an inverse cosine of the result.

21. The non-transitory computer-readable medium of claim 19, further comprising program code that is executable by the processor for causing the processor to
   determine the first principal eigenvector of the first data window by performing principal component analysis on the first data window; and
   determine the first principal eigenvector of the second data window by performing principal component analysis on the second data window.

22. The non-transitory computer-readable medium of claim 19, wherein the anomaly is indicative of an operational problem with the physical device that is distinct from the degradation.

23. The non-transitory computer-readable medium of claim 22, further comprising program code that is executable by the processor for causing the processor to generate an electronic communication configured to cause the operational problem to be mitigated.

24. The non-transitory computer-readable medium of claim 23, further comprising program code that is executable by the processor for causing the processor to transmit the electronic communication over a network to a remote computing device, the electronic communication being configured to cause the remote computing device to assist with mitigating the operational problem.

25. The non-transitory computer-readable medium of claim 19, further comprising program code that is executable by the processor for causing the processor to determine the angle change by:
   determining a first product of (i) the first principal eigenvector of the first data window and (ii) the first principal eigenvector of the second data window;
   determining a second product of (i) a norm of the first principal eigenvector of the first data window and (ii) a norm of the first principal eigenvector of the second data window;
   determining a result of dividing the first product by the second product; and
   determining an inverse cosine of the result.

26. The system of claim 7, wherein the one or more electronic signals indicate a type or a severity of the anomaly, and wherein the remote computing device is configured to determine a countermeasure to implement for mitigating the anomaly based on the type or the severity of the anomaly.

27. The system of claim 1, wherein the system is configured to:
   analyze streaming data that includes dozens of data points in substantially real time to identify one or more anomalies or one or more degradations impacting a performance of the physical device; and
   generate an electronic alert in response to identifying the one or more anomalies or the one or more degradations.

* * * * *